United States Patent
Pohl

(10) Patent No.: US 10,604,416 B2
(45) Date of Patent: Mar. 31, 2020

(54) PROCESS FOR INCREASING OPACITY OF PRECIPITATED CALCIUM CARBONATE

(71) Applicant: Omya International AG, Oftringen (CH)

(72) Inventor: Michael Pohl, Villach (AT)

(73) Assignee: OMYA INTERNATIONAL AG, Oftringen (CH)

( * ) Notice: Subject to any disclaimer, the term of this patent is extended or adjusted under 35 U.S.C. 154(b) by 0 days.

(21) Appl. No.: 15/573,635

(22) PCT Filed: May 24, 2016

(86) PCT No.: PCT/EP2016/061726
§ 371 (c)(1),
(2) Date: Nov. 13, 2017

(87) PCT Pub. No.: WO2016/189009
PCT Pub. Date: Dec. 1, 2016

(65) Prior Publication Data
US 2018/0127284 A1 May 10, 2018

(30) Foreign Application Priority Data
May 28, 2015 (EP) .................................... 15169682

(51) Int. Cl.
*C01F 11/18* (2006.01)
*C09C 1/02* (2006.01)
(Continued)

(52) U.S. Cl.
CPC .......... *C01F 11/183* (2013.01); *C01F 11/182* (2013.01); *C01F 11/185* (2013.01);
(Continued)

(58) Field of Classification Search
CPC .... C01F 11/183; C01F 11/185; D21H 19/385; D21H 17/70; D21H 17/675; C09C 1/021;
(Continued)

(56) References Cited

U.S. PATENT DOCUMENTS 3,320,026 A 5/1967 Waldeck
5,232,678 A 8/1993 Bleakley et al.
(Continued)

FOREIGN PATENT DOCUMENTS

EP 2722368 A1 4/2014
EP 2770017 A1 8/2014
(Continued)

OTHER PUBLICATIONS

English machine translation of JP2000203832 (2000).*
(Continued)

*Primary Examiner* — Richard M Rump
(74) *Attorney, Agent, or Firm* — Fay Sharpe LLP

(57) ABSTRACT

The present invention relates to a process for preparing an aqueous suspension comprising precipitated calcium carbonate. The invention further relates to an aqueous suspension comprising precipitated calcium carbonate as well as a partially dewatered or essentially completely dried precipitated calcium carbonate obtainable by the process and the use of the aqueous suspension comprising precipitated calcium carbonate and/or the partially dewatered or essentially completely dried precipitated calcium carbonate in paper making, paper coating, plastic, agricultural, adhesives, sealants and/or paint applications.

31 Claims, 2 Drawing Sheets

(51) Int. Cl.
*D21H 17/67* (2006.01)
*D21H 19/38* (2006.01)
*D21H 17/70* (2006.01)

(52) U.S. Cl.
CPC ........... *C09C 1/021* (2013.01); *D21H 17/675* (2013.01); *D21H 17/70* (2013.01); *D21H 19/385* (2013.01); *C01P 2004/51* (2013.01); *C01P 2004/61* (2013.01); *C01P 2006/12* (2013.01); *C01P 2006/22* (2013.01); *C01P 2006/60* (2013.01); *C01P 2006/82* (2013.01)

(58) Field of Classification Search
CPC .............. C01P 2006/60; C01P 2006/22; C01P 2006/12; C01P 2004/51; C01P 2004/61; C01P 2006/82
See application file for complete search history.

(56) References Cited

U.S. PATENT DOCUMENTS

| | | | | |
|---|---|---|---|---|
| 5,332,564 | A | * | 7/1994 | Chapnerkar .......... C01F 11/183 106/464 |
| 5,342,600 | A | | 8/1994 | Bleakley et al. |
| 5,364,610 | A | * | 11/1994 | Merris, Jr. ............ C01F 11/181 423/430 |
| 5,558,850 | A | | 9/1996 | Bleakley et al. |
| 6,251,356 | B1 | | 6/2001 | Mathur |
| 6,269,143 | B1 | | 9/2001 | Deutsch et al. |
| 6,761,869 | B1 | * | 7/2004 | Virtanen ................. C01F 11/18 423/432 |
| 2012/0040111 | A1 | * | 2/2012 | Kaessberger ........ B41M 5/5218 428/32.21 |
| 2013/0336859 | A1 | * | 12/2013 | Tavakkoli ............... C01F 11/18 423/175 |
| 2016/0115302 | A1 | | 4/2016 | Rentsch et al. |

FOREIGN PATENT DOCUMENTS

| | | | |
|---|---|---|---|
| GB | 1540328 | | 4/1976 |
| JP | 2000203832 | A | 7/2000 |
| JP | 2001114514 | A * | 4/2001 |
| JP | 2001114514 | A | 4/2001 |
| RU | 2205153 | C1 | 5/2003 |
| TW | 201443118 | A | 11/2014 |
| WO | 2013165600 | | 11/2013 |
| WO | WO-2014128087 | A1 * | 8/2014 ............... C08K 5/49 |

OTHER PUBLICATIONS

TIPO, First Office Action, in related Taiwanese patent application No. 105111477, dated Dec. 19, 2016, 6 pages.
TIPO, Search Report, in related Taiwanese patent application No. 105111477, dated Dec. 12, 2016, 1 page.
TIPO, Amended claims from Response to Office Action dated Dec. 19, 2016, in related Taiwanese patent application No. 105111477, 8 pages.
TIPO, Notice of Allowance, in related Taiwanese patent application No. 105111477, dated May 19, 2017, 3 pages.
EPO, First Office Action, in related European patent application No. 16724653.7, dated Dec. 14, 2018, 4 pages.
IPAU, Examination Report No. 1, in related Australian patent application No. 2016266703, dated May 23, 2018, 3 pages.
RFSIP, Search Report, in related Russian patent application No. 2017146135, dated Aug. 24, 2018, 3 pages.
RFSIP, Office Action, in related Russian patent application No. 2017146135, dated Aug. 24, 2018, 11 pages.
CAIPO, Office Action, in related Canadian patent application No. 2,986,059, dated Nov. 2, 2018, 5 pages.
International Search Report dated Aug. 1, 2016 for PCT/EP2016/061726.
The Written Opinion of the International Searching Authority dated Aug. 1, 2016 for PCT/EP2016/061726.

* cited by examiner

PROCESS FOR INCREASING OPACITY OF PRECIPITATED CALCIUM CARBONATE

CROSS-REFERENCE TO RELATED APPLICATIONS

This is a U.S. national phase of PCT Application No. PCT/EP2016/061726, filed May 24, 2016, which claims priority to European Application No. 15169682.0, filed May 28, 2015.

The present invention relates to a process for preparing an aqueous suspension comprising precipitated calcium carbonate. The invention further relates to an aqueous suspension comprising precipitated calcium carbonate as well as a partially dried or essentially completely dried precipitated calcium carbonate obtainable by the process and the use of the aqueous suspension comprising precipitated calcium carbonate and/or the partially dried or essentially completely dried precipitated calcium carbonate in paper making, paper coating, plastic, agricultural, adhesives, sealants and/or paint applications.

Calcium carbonate is used extensively in the paper industry as a filler component in paper. It is a low cost, high brightness filler used to increase sheet brightness and opacity. Its use has increased dramatically in the last decades due to the conversion from acid to alkaline papermaking at paper mills. Calcium carbonate is known to exist as natural occurring minerals as well as a synthetically produced products. Both natural and synthetic calcium carbonates are used in the paper industry. Natural carbonate, or limestone, is ground to a small particle size prior to its use in paper, while synthetic calcium carbonate is manufactured by a precipitation reaction and is therefore called precipitated calcium carbonate (PCC).

Precipitated calcium carbonate is used in huge quantities in the paper industries for various purposes such as coatings, fillers, extenders and pigments for papermaking. For example, precipitated calcium carbonate is used in the paper industries in order to impart printability, a high brightness at high opacity but also suitable smoothness and gloss to paper products. Furthermore, precipitated calcium carbonate can also be incorporated as a filler in wrapping papers of smoking articles such as cigarettes or cigars in order to control many physical properties or characteristics such as the opacity and brightness of the paper.

Besides its use in the papermaking industry, precipitated calcium carbonate is also used for various other purposes, e.g. as filler or pigment in the paint industries, and as functional filler for the manufacture of plastic materials, plastisols, sealing compounds, printing inks, rubber, toothpaste, cosmetics, agricultural applications etc.

Precipitated calcium carbonate exists in three primary crystalline forms: calcite, aragonite and vaterite, and there are many different polymorphs (crystal habits) for each of these crystalline forms.

Processes for the preparation of precipitated calcium carbonate are well known in the art, see, e.g., U.S. Pat. Nos. 6,294,143, 3,320,026, 5,232,678, 5,342,600, 5,558,850 and 6,251,356. Generally, one way to produce calcium carbonate commercially is by calcining crude limestone to obtain quicklime. Water is then added to yield an aqueous suspension of hydrated calcium oxide ("milk of lime"), and carbon dioxide is introduced into this suspension to precipitate the calcium carbonate. The product of this process is known as precipitated calcium carbonate ("PCC"). The resulting aqueous suspension, or slurry, of precipitated calcium carbonate can be used as it is or further processed (e.g., dewatered, ground, etc.) to form a dry product.

This kind of process has demonstrated its capability to produce precipitated calcium carbonate with good opacifying characteristics. Precipitated calcium carbonate is typically superior in opacifying and brightening a sheet produced from such precipitated calcium carbonate, and also as filler and/or bulk in the sheet of paper, compared to ground calcium carbonate (GCC).

However, for many applications such as in very light weight papers like cigarette paper or thin print paper a speciality mineral filler is desired which imparts maximised opacity to the respective paper product.

In this regard, it is well known to the skilled person that the opacity of a paper product can be increased by following the Kubelka-Munk theory and in case fillers/pigments having a high yellowness index but a low brightness are used. Brightness and color of the filler/pigment can be adjusted to the desired level via addition of colorants like e.g. Pigmosol® Yellow 1250 supplied by BASF. Such colorants are preferably added during the preparation of the precipitated calcium carbonate after the carbonation of the milk of lime in order to increase the opacity by adjusting the desired chromaticity coordinates. However, in certain lightweight papers that are used, for example, in the tobacco industry, such colorants are not admitted for the use as additive.

Thus, there is still a need in the art for providing alternative processes for preparing precipitated calcium carbonate, wherein such process should be simple and inexpensive, while avoiding the use of synthetic colorants, and should provide the possibility of increasing or optimizing the opacity of the obtained precipitated calcium carbonate.

Accordingly, it is an objective of the present invention to provide an alternative process for preparing a precipitated calcium carbonate preferably a precipitated calcium carbonate having improved optical properties. Another objective of the present invention may be seen in the provision of a process for preparing precipitated calcium carbonate having increased or optimized opacity. A further objective of the present invention may be seen in the provision of a process for preparing precipitated calcium carbonate having improved or optimized opacity and especially an optimized balance of whiteness R457, yellowness index and brightness, i.e. a reduced brightness and whiteness R457 and an increased yellowness index. Another objective of the present invention may be seen in the provision of a process for preparing precipitated calcium carbonate being available as partially dewatered or essentially completely dried precipitated calcium carbonate. Even a further objective of the present invention may be seen in the provision of a process for preparing precipitated calcium carbonate which can be carried out in a simple way and without using synthetic colorants. A still further objective of the present invention may be seen in the provision of a process for preparing precipitated calcium carbonate, in which the precipitated calcium carbonate material can be prepared in high yield. Further objects can be gathered from the following description of the invention.

In order to fulfil the foregoing need(s) a process according to the subject-matter as defined herein in claim 1 is provided.

Advantageous embodiments of the inventive method are defined in the corresponding sub-claims and the specification.

BRIEF DESCRIPTION OF THE SEVERAL VIEWS

Figure 1:
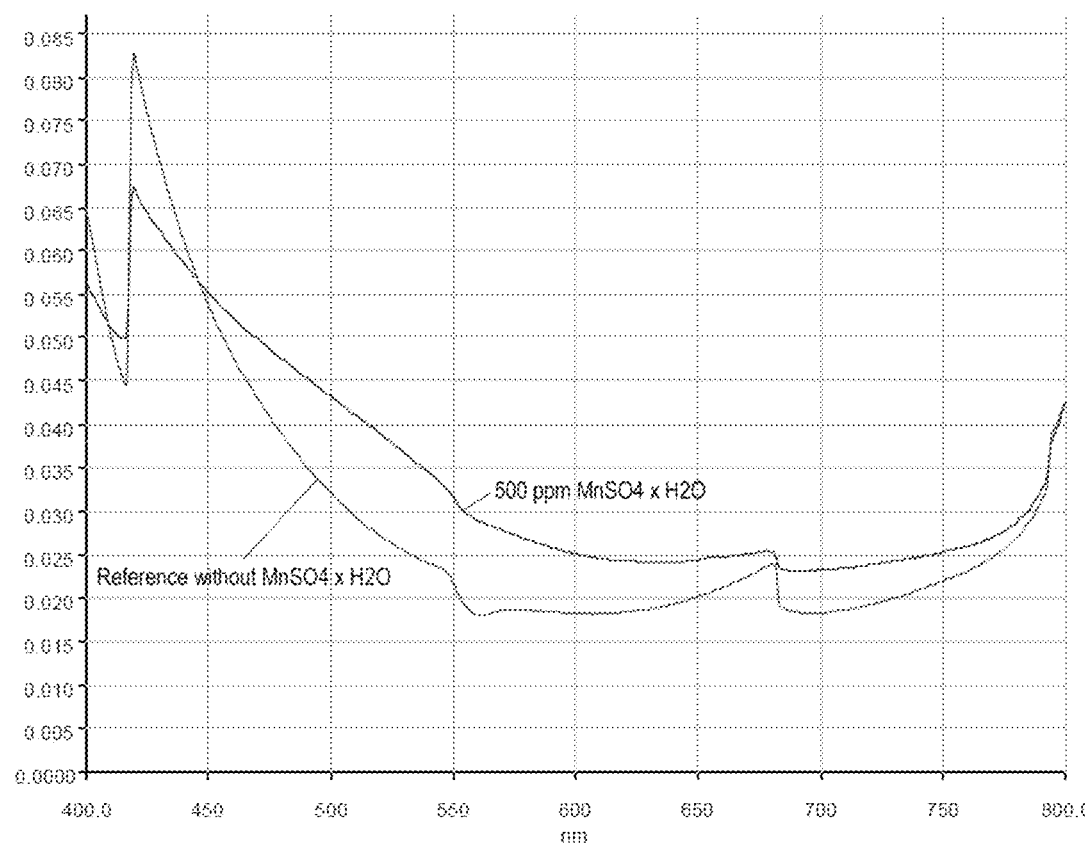
FIG. 1 is a graph containing UV and visible spectroscopy results and illustrates the effect of adding 500 ppm of manganese (II) sulfate monohydrate to a hydrated calcium carbonate suspension as discussed in Example 3.

According to one aspect of the present a process for preparing an aqueous suspension comprising precipitated calcium carbonate is provided, the process comprising the steps of:
 a) providing at least one calcium source being essentially insoluble in water;
 b) providing at least one water-soluble manganese source;
 c) providing at least one carbonate source, and
 d) carbonating the at least one calcium source of step a) with the at least one carbonate source of step c) in the presence of the at least one water-soluble manganese source of step b) to convert the calcium source at least partially into precipitated calcium carbonate.

The inventors surprisingly found that the foregoing process allows for the efficient and controlled production of precipitated calcium carbonate. According to the process of the present invention precipitated calcium carbonate having improved or optimized optical properties can be provided or prepared directly without the use of synthetic colorants. More precisely, the inventors found out that the optical properties such as the opacity of precipitated calcium carbonate being obtained by said process can be improved or optimized by specifically adding at least one water-soluble manganese source during the preparation of said precipitated calcium carbonate and especially during carbonating of the at least one calcium source.

It should be understood that for the purposes of the present invention, the following terms have the following meanings:

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as diverse assortment of thin elongated prismatic, curved bladed, steep pyramidal, chisel shaped crystals, branching tree, and coral or worm-like form. The different PCC forms may be identified according to their characteristic X-ray powder diffraction (XRD) peaks. Preferred synthetic calcium carbonate is precipitated calcium carbonate comprising aragonitic or calcitic mineralogical crystal forms or mixtures thereof.

The term "precipitation" in the meaning of the present invention refers to the formation of a solid material in a solution during a chemical reaction.

A "suspension" or "slurry" in the meaning of the present invention comprises insoluble solids and water and optionally further additives and usually contains large amounts of solids and, thus, is more viscous and generally of higher density than the liquid from which it is formed.

The term "slaking" or "slake" in the meaning of the present invention refers to the hydration of calcium source by contacting said compound with water or moisture.

The term "carbonating" or "carbonation" in the meaning of the present invention refers to a process in which at least one anionic group is replaced by carbonate.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to another aspect of the present invention, an aqueous suspension comprising precipitated calcium carbonate is provided, wherein said aqueous suspension is obtainable by the inventive process for preparing precipitated calcium carbonate.

According to a further aspect of the present invention, a partially dewatered or essentially completely dried precipitated calcium carbonate is provided, wherein said partially dewatered or essentially completely dried precipitated calcium carbonate is obtainable by the inventive process for preparing precipitated calcium carbonate.

According to another aspect, the present invention refers to the use of said aqueous suspension comprising precipitated calcium carbonate and/or said partially dewatered or essentially completely dried precipitated calcium carbonate in paper making, paper coating, plastic, agricultural, adhesives, sealants and/or paint applications. It is preferred that the aqueous suspension comprising precipitated calcium carbonate and/or the partially dewatered or essentially completely dried precipitated calcium carbonate is used in lightweight papers such as cigarette papers, thin print papers, SC magazine papers and the like, and in printing or writing papers such as copy papers, uncoated- and coated offset papers and the like.

According to one preferred embodiment of the inventive process, the at least one calcium source of step a) is selected from the group comprising calcium oxide, calcined dolomite, dolomite, limestone, calcium carbonate, hydrated calcium oxide, calcium arsenate, calcium arsenite, calcium benzoate, calcium chromate, calcium citrate, calcium fluoride, calcium phosphate, calcium silicate, calcium sulfate, calcium sulphide, calcium tartrate and mixtures thereof, and most preferably the at least one calcium source of step a) is hydrated calcium oxide.

According to another preferred embodiment of the inventive process, the at least one calcium source of step a) is provided in an aqueous environment, preferably in an aqueous environment comprising the at least one calcium source of step a) in an amount of from 1.0 to 60.0 wt.-%, preferably from 5.0 to 50.0 wt.-%, more preferably from 8.0 to 30.0 wt.-% and most preferably from 10.0 to 20.0 wt.-%, based on the total weight of the aqueous environment and the at least one calcium source of step a).

According to yet another preferred embodiment of the inventive process, the at least one water-soluble manganese source of step b) is selected from a manganese(II) source, a manganese(III) source and mixtures thereof, preferably from a manganese(II) source.

According to one preferred embodiment of the present invention, the at least one water-soluble manganese source of step b) is at least one manganese(II) source selected from the group comprising manganese(II) sulfate, manganese(II) hydroxide, manganese(II) chloride, manganese(II) acetate, manganese(II) arsenite, manganese(II) benzoate, manganese(II) bromide, manganese(II) carbonate, manganese(II) chlorate, manganese(II) citrate, manganese(II) formate, manganese(II) iodide, manganese(II) nitrate, manganese(II) oxalate, manganese(II) phosphate, manganese(II) tartrate, manganese(II) thiocyanate and mixtures thereof.

According to another preferred embodiment of the present invention, the at least one carbonate source of step c) is derived from a) a gaseous $CO_2$ source in the presence of water, preferably a $CO_2$ comprising gas in the presence of water, and/or b) a carbonate-comprising anion, preferably a carbonate-comprising anion being selected from the group consisting of sodium carbonate, potassium carbonate, sodium hydrogen carbonate, potassium hydrogen carbonate or mixtures thereof.

According to yet another preferred embodiment of the present invention, the at least one water-soluble manganese source of step b) is present in carbonating step d) in an amount from 10 ppm to 1 000 ppm (d/d), preferably from 20 ppm to 900 ppm (d/d), more preferably from 50 ppm to 800 ppm (d/d), even more preferably from 100 ppm to 700 ppm (d/d) and most preferably from 200 ppm to 600 ppm, based on the total dry weight of the at least one calcium source of step a).

According to one preferred embodiment of the present invention, the at least one calcium source of step a) is added to an aqueous environment to convert the calcium source at least partially into calcium cations before carbonating step d) is carried out.

According to another preferred embodiment of the present invention, the at least one water-soluble manganese source of step b) is added before and/or during and/or after adding the at least one calcium source of step a) to the aqueous environment, preferably the at least one water-soluble manganese source of step b) is added after adding the at least one calcium source of step a) to the aqueous environment.

According to yet another preferred embodiment of the present invention, the starting temperature of step d) is adjusted to a temperature of between 5° C. and 80° C. and most preferably to a temperature of between 10° C. and 70° C.

According to one preferred embodiment of the present invention, the aqueous suspension comprising precipitated calcium carbonate obtained has solids content from 5.0 to 40.0 wt.-%, preferably from 10.0 to 30.0 wt.-%, and most preferably from 15.0 to 20.0 wt.-%, based on the total weight of the aqueous suspension.

According to another preferred embodiment of the present invention, the precipitated calcium carbonate obtained by the process a) comprises particles having a weight median particle size $d_{50}$ value of less than 15.0 μm, more preferably of less than 10.0 μm, even more preferably of less than 5.0 μm and most preferably of less than 3.0 μm, and/or b) has a specific BET surface area of 1.0 m²/g to 50.0 m²/g, more preferably of 3.0 m²/g to 35.0 m²/g and most preferably of 4.0 m²/g to 20.0 m²/g, and/or c) has a degree of whiteness R457 of at least 85%, more preferably of at least 90%, even more preferably of between 85 and 95% and most preferably of between 90 and 95%, and/or d) has a yellowness index of at least 1.5, more preferably of at least 2.0, even more preferably of between 2.0 and 4.5 and most preferably of between 2.5 and 4.0.

According to yet another preferred embodiment of the present invention, the process further comprises step e) of drying or dewatering the obtained aqueous suspension comprising precipitated calcium carbonate to remove at least a portion of water to obtain a partially dewatered precipitated calcium carbonate or to remove more than 99 wt.-% of water to obtain an essentially completely dried precipitated calcium carbonate.

According to one preferred embodiment of the present invention, the partially dewatered precipitated calcium carbonate is in form of an aqueous suspension having solids content from 20.0 to 70.0 wt.-%, preferably from 25.0 to 65.0 wt.-%, and most preferably from 30.0 to 60.0 wt.-%, based on the total weight of the aqueous suspension.

According to another preferred embodiment of the present invention, the process further comprises step f) of treating the essentially completely dried precipitated calcium carbonate of step e) with at least one hydrophobizing agent, preferably an aliphatic carboxylic acid having a total amount of carbon atoms from C4 to C24 and/or at least one mono-substituted succinic anhydride consisting of succinic anhydride mono-substituted with a group selected from a linear, branched, aliphatic and cyclic group having a total amount of carbon atoms from C2 to C30 in the substituent and/or a phosphoric acid ester blend of one or more phosphoric acid mono-ester and one or more phosphoric di-ester, to obtain a precipitated calcium carbonate comprising on at least a part of the accessible surface area a treatment layer comprising the hydrophobizing agent.

As set out above, the inventive process for preparing precipitated calcium carbonate having improved optical properties comprises the steps a), b), c) and d). In the following, it is referred to further details of the present invention and especially the foregoing steps of the inventive process for preparing precipitated calcium carbonate having improved optical properties such as increased or optimized opacity which is expressed by an optimized balance of whiteness R457, yellowness index and brightness, i.e. a reduced brightness and whiteness R457 and an increased yellowness index. Those skilled in the art will understand that many embodiments described herein can be combined or applied together.

Characterization of Step a): Provision of at Least One Calcium Source

According to step a) of the process of the present invention, at least one calcium source being essentially insoluble in water is provided.

The term "at least one" calcium source in the meaning of the present invention means that the calcium source comprises, preferably consists of, one or more calcium sources.

In one embodiment of the present invention, the at least one calcium source comprises, preferably consists of, one calcium source. Alternatively, the at least one calcium source comprises, preferably consists of, two or more calcium sources. For example, the at least one calcium source comprises, preferably consists of, two or three calcium sources.

It is appreciated that the at least one calcium source provided in step a) of the instant process can be any calcium-comprising compound that can be at least partially converted to precipitated calcium carbonate by carbonating the provided at least one calcium source.

The term at least one "calcium source" in the meaning of the present invention refers to a compound that comprises calcium cations.

The term "insoluble in water" in the meaning of the present invention refers to systems in which discrete solid particles are observed in the solvent, i.e. the at least one calcium source forms a suspension with water, wherein the particles of the at least one calcium source are dispersed in the water.

The term "essentially" insoluble in water refers to systems in which a certain proportion of the at least one calcium source is dissolved in the water in the form of calcium cations and the corresponding counter-anion. In this regard, it is to be noted that an equilibrium exists between the particles of the at least one calcium source which are insoluble in water and calcium cations and the corresponding counter-anion being dissolved in the water such that a further proportion of the at least one calcium source is dissolved in the water in the form of calcium cations and the corresponding counter-anion as soon as calcium cations are precipitated in the form of calcium carbonate.

The at least one calcium source of step a) being essentially insoluble in water is preferably selected from the group comprising calcium oxide, calcined dolomite, dolomite, limestone, calcium carbonate, hydrated calcium oxide, calcium arsenate, calcium arsenite, calcium benzoate, calcium chromate, calcium citrate, calcium fluoride, calcium phosphate, calcium silicate, calcium sulfate, calcium sulphide, calcium tartrate and mixtures thereof.

In one embodiment of the present invention, the at least one calcium source of step a) being essentially insoluble in water is hydrated calcium oxide.

The at least one calcium source of step a) can be provided in an aqueous environment or a dry material. In one embodiment of the present invention, the at least one calcium source of step a) is provided in an aqueous environment. For example, the at least one calcium source of step a) is provided in an aqueous environment comprising, preferably consisting of, water.

In one embodiment of the present invention, the at least one calcium source of step a) is provided in an aqueous environment comprising the at least one calcium source of step a) in an amount of from 1.0 to 60.0 wt.-%, based on the total weight of the aqueous environment and the at least one calcium source of step a).

For example, if the at least one calcium source of step a) is provided in an aqueous environment, the aqueous environment preferably comprises the at least one calcium source in an amount from 5.0 to 50.0 wt.-% and more preferably from 8.0 to 30.0 wt.-%, based on the total weight of the aqueous environment and the at least one calcium source of step a). Alternatively, the aqueous environment comprises the at least one calcium source in an amount from 10.0 to 20.0 wt.-%, based on the total weight of the aqueous environment and the at least one calcium source of step a).

In one embodiment of the present invention, the at least one calcium source of step a) is thus preferably added to an aqueous environment, preferably water, to convert the at least one calcium source of step a) at least partially into calcium cations and the corresponding counter-anions.

As already indicated above, the term "aqueous environment" refers to a system comprising, preferably consisting of, water. For example, the aqueous environment consists of water. If the aqueous environment consists of water, the water to be used can be any water available such as tap water and/or deionised water.

If the at least one calcium source of step a) is calcium oxide, the at least one calcium source is thus preferably slaked with water.

"Slaking" in the meaning of the present invention refers to a process in which the calcium oxide as the at least one calcium source is hydrated. Thus, the term "slaking" refers to a process of adding water to calcium oxide as the at least one calcium source to produce hydrated calcium oxide. The water to be used in the slaking process may be any water available such as tap water and/or deionised water. Preferably, the water used for slaking the calcium oxide as the at least one calcium source of step a) is tap water.

Depending on equipment and site conditions, the slaking step is preferably carried out with water having an elevated temperature in order to provide small particles of hydrated calcium oxide having a high specific surface and additionally or alternatively in order to obtain a sufficient reaction rate. Furthermore, as the incoming water temperature may inversely affect the time required for carrying out the slaking process, a contacting of the at least one calcium source of step a) with cool water should preferably be avoided. In the case in which cool water and the at least one calcium source come in contact a condition called "drowning" may take place, resulting in particles of hydrated calcium oxide which are very coarse and not very reactive. Therefore, the temperature of the water used in the slaking process should preferably be above room temperature but below the boiling point of water.

In one embodiment of the present invention, the at least one calcium source of step a) is added to the aqueous environment in one portion and/or continuously over a period of 1 h or less, preferably over a period of 45 min or less, more preferably over a period of 30 min or less and most preferably over a period of 15 min or less to yield or provide a suitable solid content in the resulting suspension. In another preferred embodiment, the at least one calcium source of step a) is added to the aqueous environment over a period of 10 min or less to a suitable solid content in the resulting suspension. In a further embodiment of the present invention, the at least one calcium source of step a) is added to the aqueous environment in several portions to a suitable solid content in the resulting suspension, preferably in two to five portions, more preferably in two to four portions, even more preferably in two to three portions and most preferably in two portions.

In the case where the at least one calcium source of step a) is added to the aqueous environment in several portions, the at least one calcium source of step a) is preferably added in about equal portions to the aqueous environment. As an alternative, it is also possible to add the at least one calcium source of step a) in unequal portions to the aqueous environment, i.e. in larger and smaller portions. In one embodiment of the present invention, the larger portion is added first followed by the addition of the smaller portion of the at least one calcium source to the resulting suspension in order to convert the at least one calcium source of step a) at least partially into calcium cations and the corresponding counter-anions. In another embodiment of the present invention, the smaller portion of the at least one calcium source of step a) is added first followed by the addition of the larger portion to the aqueous environment in order to convert the at least one calcium source of step a) at least partially into calcium cations and the corresponding counter-anions.

The ratio of the at least one calcium source of step a) to the aqueous environment is preferably adjusted in such a way that the suspension develops a sufficient or suitable viscosity. In one embodiment of the present invention, a considerable excess of aqueous environment is used, so that the ratio of aqueous environment to the at least one calcium source of step a) in the suspension is such that the ratio (volume of aqueous environment):(volume of the at least one calcium source) is from 40:1 to 3:1, more preferably from 30:1 to 3:1 and most preferably from 20:1 to 3:1.

In one embodiment of the present invention, an additive is added to the reaction vessel before and/or during and/or after adding the at least one calcium source of step a) to the aqueous environment. Preferably, the additive is added to the reaction vessel after adding the at least one calcium source of step a) to the aqueous environment but before carbonating step d) of the instant process is started.

The additive is preferably an additive which is well known to the person skilled in the art. Examples of the additive are sugars, e.g. sucrose, sugar alcohols, e.g. Meritol®, sorbitol or mannitol, citric acid or sodium, potassium, calcium or magnesium salts of citric acid, and polyacrylic acids in their neutralized or partly neutralized forms. It is also noted that besides the afore-mentioned polyacrylic acids in their neutralized or partly neutralized forms other dispersing agents that are well known to the person skilled in the art can also be used as additives in the process of the present invention.

The additive may be added into the suspension before step d) of the process of the present invention is started; i.e. the suspension comprising the at least one calcium source contains said additive during carbonation step d).

If the at least one calcium source of step a) is calcium oxide, the at least one calcium source is preferably slaked with water. In this case, the additive can be added to the reaction vessel before and/or during and/or after slaking the at least one calcium source of step a). In one embodiment of the present invention, the additive is added to the reaction vessel before or during or after slaking the at least one calcium source of step a). For example, the additive is added to the reaction vessel during or after slaking the at least one calcium source of step a), like after slaking the at least one calcium source of step a). In one embodiment of the present invention, the additive is added to the reaction vessel during or after slaking the at least one calcium source of step a), but before step d) of the process of the present invention is started.

The additive is preferably added into the suspension in a quantity such that it is contained in the resulting suspension in a concentration between 0.001 wt.-% and 5.0 wt.-%, more preferably between 0.01 wt.-% and 1.0 wt.-% and most preferably between 0.05 wt.-% and 0.75 wt.-%, based on the total weight of the suspension.

The additive can be added to the suspension in any appropriate solid form, e.g. in the form of granules or a powder. Alternatively, the additive can be added to the suspension in the form of a suspension or solution.

In one embodiment of the present invention, the temperature of the aqueous environment added to said at least one calcium source of step a) is preferably in the range between 20° C. and 90° C., more preferably in the range between 30° C. and 60° C. and most preferably in the range between 35° C. and 55° C., for example 40° C. or 50° C.

During the conversion process of the at least one calcium source of step a) into calcium cations and the corresponding counter-anions, the temperature in the reaction vessel varies due to variation in water temperature, calcium source reactivity, and quality of water and, thus, the temperature of the suspension may be adjusted frequently. Preferably, the temperature is controlled continuously. Alternatively, the temperature may be controlled repeatedly. In another preferred embodiment, the temperature of the suspension is not adjusted during the conversion of the at least one calcium source of step a) into calcium cations and the corresponding counter-anions. In one embodiment of the present invention, the temperature of the suspension during the conversion of the at least one calcium source of step a) into calcium cations and the corresponding counter-anions is adjusted to a temperature ≤95° C., preferably ≤90° C.

In one embodiment of the present invention, the conversion process of the at least one calcium source of step a) into calcium cations and the corresponding counter-anions is carried out by agitation of the suspension. In this respect, agitation can be carried out continuously or discontinuously. However, as the degree of agitation during the conversion process may have an impact on the obtained calcium cations, the suspension is preferably agitated continuously. In this respect, too little agitation may result in uneven temperature within the suspension resulting in hot and cold spots. Such uneven temperature may result in crystals of large size and reduced surface area and agglomeration of particles, while cold spots will result in either drowning or higher amounts of unhydrated particles of the at least one calcium source.

The conversion process of the at least one calcium source of step a) into calcium cations and the corresponding counter-anions is preferably conducted up to the point where at least a part of the at least one calcium source of step a) is converted to its respective calcium cations and the corresponding counter-anion.

After carrying out the conversion process of the at least one calcium source of step a) into calcium cations and the corresponding counter-anions, the obtained suspension is formed into a suitable suspension for carrying out step d) of the present invention. The overall solid content of this aqueous suspension is preferably from 1.0 to 60.0 wt.-%, preferably from 5.0 to 50.0 wt.-%, more preferably from 8 to 30 wt.-% and most preferably from 10.0 to 20.0 wt.-%, based on the total weight of the aqueous suspension.

Additionally or alternatively, the obtained suspension from the conversion process has preferably a viscosity of less than 1 000 mPa·s and more preferably of less than 100 mPa·s, as measured with a Brookfield Dy-II Viscometer at a speed of 100 rpm and equipped with a LV-3 spindle. In the case where the obtained suspension has a solid content above or below the desired range and/or the viscosity of said suspension is too high or low the suspension may be diluted with water or up-concentrated by any conventional process known to the skilled person to obtain a suspension of said desired solid content and/or viscosity for the further process steps.

The obtained suspension comprising calcium cations and the corresponding counter-anions has preferably a pH in the range between pH 10 and 13, approximately about pH 12.5, as measured according to the measurement method described in the Examples section here below.

Characterization of Step b): Providing at Least One Water-Soluble Manganese Source According to step b) of the process of the present invention, at least one water-soluble manganese source is provided.

The term "at least one" water-soluble manganese source in the meaning of the present invention means that the manganese source comprises, preferably consists of, one or more water-soluble manganese sources.

In one embodiment of the present invention, the at least one water-soluble manganese source comprises, preferably consists of, one water-soluble manganese source. Alternatively, the at least one water-soluble manganese source comprises, preferably consists of, two or more water-soluble manganese sources. For example, the at least one water-soluble manganese source comprises, preferably consists of, two or three water-soluble manganese sources. Preferably, the at least one water-soluble manganese source comprises, preferably consists of, one water-soluble manganese source.

It is appreciated that the at least one water-soluble manganese source provided in step b) of the instant process can be any manganese-comprising compound that is soluble in water.

The term "water-soluble" manganese source or "soluble in water" in the meaning of the present invention refers to systems in which no discrete solid particles are observed in the solvent, i.e. the at least one manganese source forms a solution with water, wherein the particles of the at least one manganese source are dissolved in the solvent. Alternatively, the at least one manganese source is considered as being "water-soluble" if the at least one water-soluble manganese source provided in step b) forms manganese cations which are dissolved in water and thus leading to a continuous driving force for dissolution if the manganese cations are permanently consumed by its incorporation in the crystal lattice of the calcium carbonate.

The term at least one water-soluble "manganese source" in the meaning of the present invention refers to a compound that comprises manganese ions, i.e. manganese cations.

In one embodiment of the present invention, the at least one water-soluble manganese source provided in step b) of the instant invention is selected from a manganese(II) source, a manganese(III) source and mixtures thereof.

For example, the at least one water-soluble manganese source provided in step b) of the instant invention is a manganese(II) source. Alternatively, the at least one water-soluble manganese source provided in step b) of the instant invention is a manganese(III) source. Alternatively, the at least one water-soluble manganese source provided in step b) of the instant invention is a mixture comprising at least one manganese(II) source and at least one manganese(III) source. Preferably, the at least one water-soluble manganese source provided in step b) of the instant invention is a manganese(II) source.

If the at least one water-soluble manganese source provided in step b) of the instant invention is a manganese(II) source, the at least one water-soluble manganese source is preferably selected from the group comprising manganese (II) sulfate, manganese(II) hydroxide, manganese(II) chloride, manganese(II) acetate, manganese(II) arsenite, manganese(II) benzoate, manganese(II) bromide, manganese(II) carbonate, manganese(II) chlorate, manganese(II) citrate, manganese(II) formate, manganese(II) iodide, manganese (II) nitrate, manganese(II) oxalate, manganese(II) phosphate, manganese(II) tartrate, manganese(II) thiocyanate and mixtures thereof.

In one embodiment of the instant invention, the at least one water-soluble manganese source is manganese(II) sulfate.

In the context it is to be noted that the terms "manganese (II) source" and "manganese(III) source" shall include the respective manganese-comprising compound in the anhydrous form as well as forms comprising crystal water (hydrate).

The at least one water-soluble manganese source of step b) can be provided in form of an aqueous solution, an aqueous suspension or a dry material. In one embodiment of the present invention, the at least one water-soluble manganese source of step b) is provided in form of an aqueous solution.

The term "aqueous solution" relating to the at least one water-soluble manganese source of step b) in the meaning of the present invention refers to systems in which no discrete solid particles are observed in the solvent, i.e. the at least one water-soluble manganese source forms a solution with water, wherein the particles of the at least one water-soluble manganese source are dissolved in the solvent.

The term "aqueous suspension" relating to the at least one water-soluble manganese source of step b) in the meaning of the present invention refers to a system comprising solvent and the at least one water-soluble manganese source, wherein a part of the particles of the at least one water-soluble manganese source are present as insoluble solids in the solvent.

In one embodiment of the present invention, the at least one water-soluble manganese source of step b) is provided in form of an aqueous solution or aqueous suspension comprising the at least one water-soluble manganese source in an amount of from 1.0 to 60.0 wt.-%, based on the total weight of the aqueous solution or aqueous suspension.

For example, if the at least one water-soluble manganese source of step b) is provided in form of an aqueous solution or aqueous suspension, the aqueous solution or aqueous suspension preferably comprises the at least one water-soluble manganese source from 5.0 to 50.0 wt.-% and more preferably from 10.0 to 45.0 wt.-%, based on the total weight of the aqueous solution or aqueous suspension. Alternatively, the aqueous solution or aqueous suspension comprises the at least one water-soluble manganese source of step b) in an amount from 15.0 to 40.0 wt.-%, based on the total weight of the aqueous solution or aqueous suspension.

In one embodiment of the present invention, the aqueous solution or aqueous suspension comprises the at least one water-soluble manganese source of step b) in an amount from 20.0 to 35.0 wt.-%, like from 25.0 to 35.0 wt.-%, based on the total weight of the aqueous solution or aqueous suspension.

Preferably, the at least one water-soluble manganese source of step b) is provided in form of an aqueous solution.

For example, if the at least one water-soluble manganese source of step b) is manganese(II) sulfate, the aqueous solution comprises manganese(II) sulfate in an amount from 1.0 to 60.0 wt.-%, preferably from 5.0 to 50.0 wt.-%, more preferably from 10.0 to 45.0 wt.-%, still more preferably from 15.0 to 40.0 wt.-% and most preferably from 20.0 to 35.0 wt.-%, like from 25.0 to 35.0 wt.-%, based on the total weight of the aqueous solution.

Characterization of Step c): Providing at Least One Carbonate Source

According to step c) of the process of the present invention, at least one carbonate source is provided.

The term "at least one" carbonate source in the meaning of the present invention means that the carbonate source comprises, preferably consists of, one or more carbonate sources.

In one embodiment of the present invention, the at least one carbonate source comprises, preferably consists of, one carbonate source. Alternatively, the at least one carbonate source comprises, preferably consists of, two or more carbonate sources. For example, the at least one carbonate source comprises, preferably consists of, two or three carbonate sources.

It is appreciated that the at least one carbonate source provided in step c) of the instant process can be any compound that is suitable for carbonating the at least one calcium source.

In one embodiment of the present invention, the at least one carbonate source of step c) is derived from a gaseous $CO_2$ source in the presence of water.

If the at least one carbonate source is derived from a gaseous $CO_2$ source in the presence of water, the carbonate source is, for example, carbon dioxide or a carbon dioxide containing gas. Accordingly, if the at least one carbonate source is derived from a gaseous $CO_2$ source in the presence of water, the carbonate source is preferably carbon dioxide dissolved in water.

Additionally or alternatively, the gaseous $CO_2$ source can be supplied from an external source such as from flue gases and/or exhaust gases of industrial processes using furnaces and kilns and/or from suitable reactions of carbonate salts with acids etc. However, it is to be noted that the gaseous carbon dioxide source provided in step c) of the inventive process is not particularly limited provided said source contains no reactive gas.

The gaseous $CO_2$ source of step c) may be provided in a concentrated form or in a diluted form. If the gaseous carbon dioxide source is provided in a diluted form, the carbon dioxide is preferably provided in admixture with air or the like and is thus a $CO_2$ comprising gas.

In one embodiment of the present invention, the gaseous $CO_2$ source of step c) is a $CO_2$ comprising gas.

In this case, the gaseous $CO_2$ source of step c) in form of a $CO_2$ comprising gas has, in terms of volume, a concentration in, for example, air of less than 40.0 vol.-%, more preferably less than 35.0 vol.-% and most preferably between 10.0 vol.-% and 30.0 vol.-% based on the total volume of the $CO_2$ comprising gas. The minimum carbon dioxide content in the gaseous $CO_2$ source in form of a $CO_2$ comprising gas may be about 5.0 vol.-%, based on the total volume of the $CO_2$ comprising gas.

Additionally or alternatively, the at least one carbonate source of step c) is derived from a carbonate-comprising anion.

If carbonate-comprising anions are provided in step c) of the process of the present invention as the at least one carbonate source, the carbonate-comprising anions may be provided in any form of carbonate salts which are soluble in water, i.e. dissolve in water to form a homogeneous solution. In one embodiment of the present invention, carbonate-comprising anions refer to carbonate salts, which when mixed with deionised water provide a solubility of more than 50 g/l at 20° C., preferably of more than 100 g/l at 20° C., more preferably of more than 150 g/l at 20° C. and most preferably of more than 200 g/l at 20° C.

It is thus appreciated that the at least one carbonate source of step c) in form of a carbonate-comprising anion is preferably selected from the group comprising alkali carbonates and/or alkali hydrogen carbonates, wherein the alkali ion of the alkali carbonate and/or alkali hydrogen carbonate is selected from sodium, potassium and mixtures thereof. Sodium carbonate, potassium carbonate, sodium hydrogen carbonate, potassium hydrogen carbonate and mixtures thereof are preferred carbonate-comprising anions of step c) of the process of the present invention. In one preferred embodiment, the carbonate-comprising anions are sodium carbonate.

In the context of the present invention, the term "sodium carbonate" shall include sodium carbonate in the anhydrous form as well as forms comprising crystal water (hydrate). In one preferred embodiment, the sodium carbonate of the present invention is anhydrous sodium carbonate ($Na_2CO_3$) or sodium carbonate decahydrate ($Na_2CO_3 \cdot 10\ H_2O$).

The term "potassium carbonate" also refers to potassium carbonate in the anhydrous form as well as forms comprising crystal water (hydrate). Preferably, the potassium carbonate of the present invention is anhydrous potassium carbonate ($K_2CO_3$).

In the context of the present invention, the term "sodium hydrogen carbonate" shall include sodium hydrogen carbonate in the anhydrous form as well as forms comprising crystal water (hydrate). Preferably, the sodium hydrogen carbonate of the present invention is anhydrous sodium hydrogen carbonate ($NaHCO_3$).

In the context of the present invention, the term "potassium hydrogen carbonate" shall also include potassium hydrogen carbonate in the anhydrous form as well as forms comprising crystal water (hydrate). Preferably, the potassium hydrogen of the present invention is anhydrous potassium hydrogen carbonate ($KHCO_3$).

In case carbonate-comprising anions are provided in step c) of the process of the present invention as the at least one carbonate source, said carbonate-comprising anions can be provided in any appropriate solid form, e.g. in the form of granules or a powder. Alternatively, said carbonate-comprising anions can be provided in the form of a suspension or solution.

Characterization of Step d): Carbonating the at Least One Calcium Source

According to step d) of the process of the present invention, said at least one calcium source of step a) is carbonated with the at least one carbonate source of step c) to convert the calcium source at least partially into precipitated calcium carbonate. It is one requirement of the present invention that the carbonating of the at least one calcium source of step a) with the at least one carbonate source of step c) is carried out in the presence of the at least one water-soluble manganese source of step b).

The at least one calcium source of step a) is preferably provided in an aqueous environment, and comprises, preferably consists of, water, the at least one calcium source and impurities normally associated with calcium-comprising suspensions, for example, silica, magnesium carbonate and other calcium compounds differing from the at least one calcium source of step a).

In one embodiment of the present invention, said aqueous environment comprises the at least one calcium source of step a) in an amount of from 1.0 to 60.0 wt.-%, preferably from 5.0 to 50.0 wt.-%, more preferably from 8.0 to 30.0 wt.-% and most preferably from 10.0 to 20.0 wt.-%, based on the total weight of the aqueous environment and the at least one calcium source of step a).

For example, in the case where the aqueous environment comprises hydrated calcium oxide as the at least one calcium source of step a), the aqueous environment comprises hydrated calcium oxide in an amount of from 1.0 to 60.0 wt.-%, preferably from 5.0 to 50.0 wt.-%, more preferably from 8.0 to 30.0 wt.-% and most preferably from 10.0 to 20.0 wt.-%, based on the total weight of the aqueous environment and hydrated calcium oxide.

The term "carbonating" in the meaning of the present invention means contacting the at least one calcium source of step a) with a sufficient amount of at least one carbonate source until at least a part of the provided calcium source is converted to a crystalline calcium carbonate precipitate (precipitated calcium carbonate).

The term "converting at least partially into PCC" in the meaning of the present invention means that the at least one calcium source provided in step a) is carbonated such as to obtain PCC.

Step d) involves contacting the at least one calcium source of step a) with a sufficient amount of the at least one carbonate source of step c) until at least a part of the provided calcium source is converted to a crystalline calcium carbonate precipitate (precipitated calcium carbonate). The carbonation is continued until substantially the entire calcium source is precipitated, so that the obtained aqueous suspension is composed almost entirely of a crystalline calcium carbonate precipitate.

For contacting the at least one calcium source of step a) with said at least one carbonate source of step c), the at least one carbonate source in form of a gaseous $CO_2$ source is preferably bubbled through a suspension of the at least one calcium source. It is thus appreciated that the at least one calcium source of step a) is preferably provided in an aqueous environment as defined above. By bubbling the gaseous $CO_2$ source through this aqueous suspension, a sufficient mixing may be achieved by the flow of the gas in the aqueous suspension, so that an additional agitation is not required. Additionally or alternatively, the aqueous suspension comprising the at least one calcium source of step a) is agitated, which may provide a more thorough mixing and thus a shorter period of time for completing the conversion of the at least one calcium source into calcium carbonate, namely precipitated calcium carbonate. In one embodiment, the aqueous suspension comprising the at least one calcium source of step a) is additionally agitated to ensure a thorough mixing of the particles in order to provide a sufficient amount of unreacted calcium-comprising particles for contacting the particles with said gaseous $CO_2$ source. Such agitation can be carried out continuously or discontinuously as long as the mixing provides a sufficient conversion of the at least one calcium source into precipitated calcium carbonate. In one preferred embodiment, the aqueous suspension is preferably agitated continuously.

In one embodiment of the present invention, said at least one carbonate source of step b) in form of a gaseous $CO_2$ source is preferably added to the suspension comprising the at least one calcium source of step a) by bubbling the gaseous $CO_2$ source through the suspension in a constant rate. Said rate is preferably in the range between 0.1 and 10.0 kg $CO_2$/h per kg calcium source, more preferably in the range between 0.2 and 5.0 kg $CO_2$/h per kg calcium source and most preferably in the range between 0.2 and 1.0 kg $CO_2$/h per kg calcium source.

In case the at least one calcium source of step a) is contacted with the at least one carbonate source of step b) in form of a carbonate-comprising anion, the carbonate-comprising anions are preferably added to said at least one calcium source in any appropriate solid form, e.g. in the form of granules or a powder or in the form of a suspension or solution. In one embodiment of the present invention, the at least one calcium source of step a) is provided in an aqueous environment which is agitated during the addition of the carbonate-comprising anions, as this may provide a more thorough mixing and thus a shorter period of time for completing the conversion of the at least one calcium source into calcium carbonate, namely precipitated calcium carbonate. Such agitation can be carried out continuously or discontinuously as long as the mixing provides a sufficient conversion of the at least one calcium source into precipitated calcium carbonate. In one embodiment of the present invention, the at least one calcium source of step a) is provided in an aqueous environment, i.e. in form of an aqueous suspension, which is preferably agitated continuously.

In one embodiment of the present invention, the carbonation, i.e. the conversion of the at least one calcium source of step a) into precipitated calcium carbonate is monitored by the change of the pH value and/or the electrical conductivity and/or temperature and/or $CO_2$ content in the offgas in order to control the progress or completion of the reaction.

For instance, the pH of the aqueous environment, i.e. the aqueous suspension, comprising the at least one calcium source of step a) of the process of the present invention is preferably in the range between pH 10 and 13, approximately about pH 12.5. In one embodiment of the present invention, the pH of the aqueous suspension decreases during contacting the at least one calcium source of step a) with said at least one carbonate source of step b) such that the obtained aqueous suspension after carrying out process step d) has a pH in the range of 7 to 13, and more preferably in the range of 7 to 12. For example, the obtained aqueous suspension after carrying out process step d) has a pH in the range of 7 to 11, like in the range of 7 to 10 or in the range of 7 to 9.

As already mentioned above, it is required that carbonating step d) is carried out in the presence of the at least one water-soluble manganese source of step b).

It is appreciated that the at least one water-soluble manganese source of step b) can be provided in form of an aqueous solution, aqueous suspension or a dry material. If the at least one water-soluble manganese source of step b) is provided in form of an aqueous solution or aqueous suspension, the aqueous solution or aqueous suspension comprises the at least one water-soluble manganese source of step b) in an amount from 1.0 to 60.0 wt.-%, preferably from 5.0 to 50.0 wt.-%, more preferably from 10.0 to 45.0 wt.-%, still more preferably from 15.0 to 40.0 wt.-% and most preferably from 20.0 to 35.0 wt.-%, like from 25.0 to 35.0 wt.-%, based on the total weight of the aqueous solution or aqueous suspension. For example, the at least one water-soluble manganese source of step b) can be provided in form of an aqueous solution.

Additionally or alternatively, it is appreciated that the at least one water-soluble manganese source of step b) is preferably present in carbonating step d) in an amount from 10 ppm to 1 000 ppm (d/d), based on the total dry weight of the at least one calcium source of step a). For example, the at least one water-soluble manganese source of step b) is present in carbonating step d) in an amount from 20 ppm to 900 ppm (d/d), more preferably from 50 ppm to 800 ppm (d/d) and even more preferably from 100 ppm to 700 ppm (d/d), based on the total dry weight of the at least one calcium source of step a). In one embodiment of the present invention, the at least one water-soluble manganese source of step b) is present in carbonating step d) in an amount from 200 ppm to 600 ppm, based on the total dry weight of the at least one calcium source of step a).

Without wishing to being bound to any theory, the inventors of the present invention believe that the manganese ions of the at least one water-soluble manganese source of step b) are incorporated as foreign ions in the calcite crystal lattice during carbonating the at least one calcium source of step a), i.e. its conversion to precipitated calcium carbonate, and thus leads to precipitated calcium carbonate having an optimized balance of whiteness R457, yellowness index and brightness.

It is thus a requirement of the present invention that the at least one water-soluble manganese source of step b) is present during carbonating the at least one calcium source of step a), i.e. its conversion to precipitated calcium carbonate. Preferably, the at least one water-soluble manganese source of step b) is present during carbonating step d) such that the manganese ions of the at least one water-soluble manganese source can be incorporated as foreign ions in the calcite crystal lattice of the precipitated calcium carbonate.

It is thus preferred that the at least one water-soluble manganese source of step b) is added to the at least one calcium source of step a), preferably provided in an aqueous environment, before carbonating step d) is carried out. Additionally or alternatively, the at least one water-soluble manganese source of step b) is added to the at least one calcium source of step a) during carbonating step d) is carried out.

In one embodiment of the present invention, the at least one water-soluble manganese source of step b) is added to the at least one calcium source of step a) in one portion and/or continuously over a period of 1 h or less, preferably over a period of 45 min or less, more preferably over a period of 30 min or less and most preferably over a period of 15 min or less to yield or provide a suitable distribution of the at least one water-soluble manganese source of step b) within the at least one calcium source of step a). In another embodiment of the present invention, the at least one water-soluble manganese source of step b) is added to the at least one calcium source of step a) continuously over a period of 10 min or less, like a period of 5 min or less.

For example, the at least one water-soluble manganese source of step b) is added to the at least one calcium source of step a) in one portion.

In a further embodiment of the present invention, the at least one water-soluble manganese source of step b) is added to the at least one calcium source of step a) in several portions, preferably in two to five portions, more preferably in two to four portions, even more preferably in two to three portions and most preferably in two portions.

In the case where the at least one water-soluble manganese source of step b) is added to the at least one calcium source of step a) in several portions, the at least one water-soluble manganese source of step b) is preferably added in about equal portions to the at least one calcium source of step a). As an alternative, it is also possible to add the at least one water-soluble manganese source of step b) in unequal portions to the at least one calcium source of step a), i.e. in larger and smaller portions. In one embodiment of the present invention, the larger portion is added first followed by the addition of the smaller portion of the at least one water-soluble manganese source of step b) to the at least one calcium source of step a). In another embodiment of the present invention, the smaller portion of the at least one water-soluble manganese source of step b) is added first followed by the addition of the larger portion to the at least one calcium source of step a).

If the at least one calcium source of step a) is added to an aqueous environment to convert the calcium source at least partially into calcium cations before carbonating step d) is carried out, the at least one water-soluble manganese source of step b) is preferably added before and/or during and/or after the conversion of the at least one calcium source of step a) into calcium cations and the corresponding counter-anions.

For example, the at least one water-soluble manganese source of step b) is preferably added before and during and after the conversion of the at least one calcium source of step a) into calcium cations and the corresponding counter-anions. In one embodiment of the present invention, the at least one water-soluble manganese source of step b) is preferably added during and after the conversion of the at least one calcium source of step a) into calcium cations and the corresponding counter-anions.

In case the at least one water-soluble manganese source of step b) is added before and during and after or during and after the conversion of the at least one calcium source of step a) into calcium cations and the corresponding counter-anions, the at least one water-soluble manganese source of step b) is preferably added in several portions and/or continuously over the period required for the conversion of the at least one calcium source of step a).

If the at least one water-soluble manganese source of step b) is added in several portions before and during and after or during and after the conversion of the at least one calcium source of step a) into calcium cations and the corresponding counter-anions, the at least one water-soluble manganese source of step b) is preferably added in two to five portions, more preferably in two to four portions, even more preferably in two or three portions.

Alternatively, the at least one water-soluble manganese source of step b) is preferably added before or during or after the conversion of the at least one calcium source of step a) into calcium cations and the corresponding counter-anions. In one embodiment of the present invention, the at least one water-soluble manganese source of step b) is preferably added during or after the conversion of the at least one calcium source of step a) into calcium cations and the corresponding counter-anions. For example, the at least one water-soluble manganese source of step b) is preferably added after the conversion of the at least one calcium source of step a) into calcium cations and the corresponding counter-anions.

In this case the at least one water-soluble manganese source of step b) is preferably added in one portion and/or continuously before or during or after the conversion of the at least one calcium source of step a) into calcium cations and the corresponding counter-anions.

In one embodiment of the present invention, the at least one water-soluble manganese source of step b) is added during step d) of the inventive process. In this case the at least one water-soluble manganese source of step b) is preferably added in one portion and/or continuously, like in one portion, during process step d). If the at least one water-soluble manganese source of step b) is added during step d) of the inventive process, it is required that the at least one water-soluble manganese source is added as long as its incorporation into the crystal lattice of the precipitated calcium carbonate is possible. Thus, the at least one water-soluble manganese source of step b) is preferably added at the beginning of, e.g. in the first half of, carbonating step d). In one embodiment of the present invention, the at least one water-soluble manganese source of step b) is added during carbonating step d) until the carbonating is stopped.

The temperature provided at the beginning of step d) of the present invention is decisive for controlling the formation of the resulting precipitated calcium carbonate or its properties even though the temperature employed may vary within a specific range. For example, the starting temperature of step d) is adjusted to a temperature of between 5° C. and 80° C. and most preferably to a temperature of between 10° C. and 70° C.

In one embodiment of the present invention, the starting temperature of step d) is adjusted to a temperature of between 10° C. and 50° C. or between 25° C. and 35° C., like about 30° C.

The temperature may preferably be controlled and maintained at said starting temperature while step d) is carried out. In this respect, it is to be noted that the term "the temperature is maintained" during said process step in the meaning of the present invention relates to a temperature which does preferably not exceed the starting temperature by more than 5° C.; i.e. if the starting temperature is for example adjusted to a temperature of 25° C., the temperature during process step d) may not exceed 30° C.

In another preferred embodiment, the starting temperature of process step d) is allowed to rise while carbonating step d) is carried out. However, due to the exothermic reaction the temperature of the reaction mixture may rise to temperatures of 90° C. and more. The maximum temperature in this embodiment of the process is preferably not more than 90° C. and most preferably the maximum temperature reached during step d) is not more than about 80° C. For example, the maximum temperature reached during process step d) is preferably between 50 and 80° C.

Additionally or alternatively, an additive as mentioned above can be added into the suspension before step d) of the process of the present invention is carried out; i.e. the suspension comprising the at least one calcium source contains said additive during carbonation step d). The additive is preferably selected from sugars, e.g. sucrose, sugar alcohols, e.g. Meritol®, sorbitol or mannitol, citric acid or sodium, potassium, calcium or magnesium salts of citric acid, and polyacrylic acids in their neutralized or partly neutralized forms. In one embodiment, the additive is sorbitol.

If an additive is present during carbonation step d), the starting temperature of step d) can be adjusted to a temperature being above the temperature adjusted without the addition of an additive in order to precipitate calcium carbonate of comparable particle size. For example, if an additive is present during step d), the starting temperature of step d) is adjusted to a temperature of between 30° C. and 80° C. or between 40° C. and 60° C., like about 50° C.

By carrying out step d) of the process of the present invention a precipitated calcium carbonate product is obtained comprising manganese ions, preferably manganese (II) ions and/or manganese(III) ions, more preferably manganese(II) ions, in the crystal lattice of the precipitated calcium carbonate.

Accordingly, the time required for carrying out the carbonation of step d) is the time required to almost complete the conversion of the of the at least one calcium source of step a) into precipitated calcium carbonate. Such almost complete conversion of the of the at least one calcium source of step a) into precipitated calcium carbonate is preferably obtained within 4 hours, more preferably within 3 hours, even more preferably within 2 hours and most preferably within 90 min, calculated from the start of contacting the of the at least one calcium source of step a) with the at least one carbonate source of step b) in the presence of the at least one water-soluble manganese source.

The precipitated calcium carbonate product obtained is preferably in the form of an aqueous suspension, wherein the solid content can be adjusted to any solid content suitable for application in the paper making, paper coating, plastic, agricultural, adhesives, sealants and/or paint industries. In this respect, it is to be noted that the obtained precipitated calcium carbonate can be used directly without carrying out further treatment steps.

In one embodiment of the present invention, precipitated calcium carbonate in the form of an aqueous suspension has a solid content of from 5.0 to 40.0 wt.-%, more preferably from 10.0 to 30.0 wt.-% and most preferably from 15.0 to 20.0 wt.-%, based on the total weight of the aqueous suspension. In the case where the obtained suspension has a solid content of precipitated calcium carbonate above or below the desired range the aqueous suspension may be diluted with water or up-concentrated by any conventional process known to the skilled person to obtain a suspension of said desired solid content.

In another embodiment of the present invention, said aqueous suspension preferably has a pH value in the range of 7 to 13, more preferably in the range of 7 to 12, even more preferably in the range of 7 to 11 and most preferably in the range of 7 to 10, like in the range of 7 to 9. The viscosity is preferably less than 1 000 mPa·s, more preferably less than 500 mPa·s and most preferably less than 300 mPa·s, as measured with a Brookfield DV-II Viscometer at a speed of 100 rpm and equipped with a LV-3 spindle.

In one embodiment of the present invention, the obtained aqueous suspension comprising precipitated calcium carbonate may be further dried or dewatered in a further process step e), optionally up to the point of obtaining a partially dewatered precipitated calcium carbonate or an essentially completely dried precipitated calcium carbonate in case more than 99.0 wt.-% of water, based on the total weight of water, is removed from the aqueous suspension.

The term "dried" is understood to refer to calcium carbonate particles having a total surface moisture content of less than 3.0 wt.-%, preferably less than 2.0 wt.-%, more preferably less than 1.5 wt.-% and most preferably of less than 1.0 wt.-%, based on the total weight of the precipitated calcium carbonate. In one embodiment of the present invention, the calcium carbonate particles have a total surface moisture content of less than 0.8 wt.-%, preferably less than 0.7 wt.-% and most preferably of less than 0.6 wt.-%, based on the total weight of the precipitated calcium carbonate. For example, the calcium carbonate particles have a total surface moisture content of less than 0.5 wt.-%, based on the total weight of the calcium carbonate. For the purpose of the present invention, the term "total surface moisture content" refers to the amount of water absorbed on the surface of the calcium carbonate and the pores within the calcium carbonate. The wt.-% water of the present invention is determined in an oven by moisture loss at 105° C. for at least 3 hours or until a constant weight has been reached. The total surface moisture content of the dried precipitated calcium carbonate is preferably determined within 30 minutes after preparing the dried precipitated calcium carbonate. That is to say, the total surface moisture content of the dried precipitated calcium carbonate, after 30 minutes of preparing the dried precipitated calcium carbonate, can be higher than the above-mentioned total surface moisture content if the particles are, e.g. exposed to air humidity.

If the aqueous suspension described above is partially dewatered, the partially dewatered precipitated calcium carbonate obtained in step e) is preferably in form of an aqueous suspension having high solids content, i.e. the solids content is above the solids content of the aqueous suspension obtained after step d) of the instant process. For example, the partially dewatered precipitated calcium carbonate obtained in step e) is in form of an aqueous suspension having solids content from 20.0 to 70.0 wt.-%, preferably from 25.0 to 65.0 wt.-%, and most preferably from 30.0 to 60.0 wt.-%, based on the total weight of the aqueous suspension.

If the aqueous suspension described above is essentially completely dried, the solids (i.e. dry or containing as little water that it is not in a fluid form) of precipitated calcium carbonate obtained in step e) can be in the form of granules or a powder. In the case of an essentially completely dried product, this product may additionally be treated with at least one hydrophobizing agent, preferably an aliphatic carboxylic acid having a total amount of carbon atoms from C4 to C24 and/or at least one mono-substituted succinic anhydride consisting of succinic anhydride mono-substituted with a group selected from a linear, branched, aliphatic and cyclic group having a total amount of carbon atoms from C2 to C30 in the substituent and/or a phosphoric acid ester blend of one or more phosphoric acid mono-ester and one or more phosphoric di-ester during and/or before and/or after drying.

Thus, the present process may comprise a further step f) of treating the essentially completely dried precipitated calcium carbonate of step e) with at least one hydrophobizing agent, preferably an aliphatic carboxylic acid having a total amount of carbon atoms from C4 to C24 and/or at least one mono-substituted succinic anhydride consisting of succinic anhydride mono-substituted with a group selected from a linear, branched, aliphatic and cyclic group having a total amount of carbon atoms from C2 to C30 in the substituent and/or a phosphoric acid ester blend of one or more phosphoric acid mono-ester and one or more phosphoric di-ester, to obtain a precipitated calcium carbonate comprising on at least a part of the accessible surface area a treatment layer comprising the hydrophobizing agent.

If the instant process comprises step f), it is appreciated that step f) can be carried out during and/or after drying step e), preferably after drying step e).

The hydrophobizing agent used in treatment step f) may be any agent known to the skilled person which is capable to form a hydrophobic treatment layer on at least a part of the accessible surface area of the precipitated calcium carbonate particles of step e).

The process step f) of treating the precipitated calcium carbonate of step e) with at least one mono-substituted succinic anhydride and/or with at least one phosphoric acid ester blend and suitable compounds for coating are described in EP 2 722 368 A1 and EP 2 770 017 A1, which are thus incorporated herewith by references.

Suitable aliphatic carboxylic acids for treating the precipitated calcium carbonate-comprising material of step e) are for example aliphatic linear or branched carboxylic acids having between 4 and 24 carbon atoms.

The aliphatic carboxylic acid in the meaning of the present invention may be selected from one or more straight chain, branched chain, saturated, unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic carboxylic acid is selected from saturated unbranched carboxylic acids, that is to say the aliphatic carboxylic acid is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the aliphatic carboxylic acid is selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of myristic acid, palmitic acid, stearic acid and mixtures thereof.

For example, the aliphatic carboxylic acid is stearic acid.

By using the process of the present invention, it is possible to provide precipitated calcium carbonate particles having a specifically decreased particle size. Preferably the obtained precipitated calcium carbonate particles have an weight median particle size $d_{50}$ value of less than 15.0 µm, more preferably of less than 10.0 µm, even more preferably of less than 5.0 µm and most preferably of less than 3.0 µm, as determined by sedimentation using the instrument Sedigraph™ III Plus of Micromeritics Instrument Corporation.

Throughout the present document, the "particle size" of precipitated calcium carbonate, or other particulate materials is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise.

In another embodiment of the present invention, the particles of the obtained precipitated calcium carbonate provide a specific BET surface area of 1.0 m²/g to 50.0 m²/g, more preferably of 3.0 m²/g to 35.0 m²/g and most preferably of 4.0 m²/g to 20.0 m²/g, as measured using nitrogen and the BET method according to ISO 9277.

In another preferred embodiment, the obtained precipitated calcium carbonate has a specific BET surface area within the range of 1.0 m²/g to 50.0 m²/g and the particles have a weight median particle size $d_{50}$ value of less than 15.0 µm, as determined by sedimentation using the instrument Sedigraph™ III Plus of Micromeritics Instrument Corporation. Alternatively, the obtained precipitated calcium carbonate has a specific BET surface area within the range of 3.0 m²/g to 35.0 m²/g and the particles have a weight median particle size $d_{50}$ value of less than 10.0 µm, as determined by sedimentation using the instrument Sedigraph™ III Plus of Micromeritics Instrument Corporation. Alternatively, the obtained precipitated calcium carbonate has a specific BET surface area within the range of 4.0 m²/g to 20.0 m²/g and the particles have a weight median particle size $d_{50}$ value of less than 5.0 µm, as determined by sedimentation using the instrument Sedigraph™ III Plus of Micromeritics Instrument Corporation. Alternatively, the obtained precipitated calcium carbonate has a specific BET surface area within the range of 4.0 m²/g to 20.0 m²/g and the particles have a weight median particle size $d_{50}$ value of less than 3.0 µm, as determined by sedimentation using the instrument Sedigraph™ III Plus of Micromeritics Instrument Corporation.

Furthermore, it is preferred that the obtained precipitated calcium carbonate has an optimized degree of whiteness R457. In particular, it is appreciated that the obtained precipitated calcium carbonate has a degree of whiteness R457, measured in accordance with the ISO 2469 Standard, of at least 85%, more preferably of at least 90% and most preferably of between 85% and 95%. For example, the obtained precipitated calcium carbonate has a degree of whiteness R457, measured in accordance with the ISO 2469 Standard, of between 90% and 95%.

Additionally or alternatively, the precipitated calcium carbonate obtained by the process of the process of the present invention has an optimized Yellowness Index, In particular, the precipitated calcium carbonate obtained by the process of the process of the present invention has a Yellowness Index according to DIN 6167 of at least 1.5, more preferably of at least 2.0 and even more preferably of between 2.0 and 4.5. For example, the precipitated calcium carbonate obtained by the process of the process of the present invention has a Yellowness Index according to DIN 6167 of between 2.5 and 4.0.

For example, the obtained precipitated calcium carbonate has a specific BET surface area within the range of 1.0 m$^2$/g to 50.0 m$^2$/g, the particles have a weight median particle size $d_{50}$ value of less than 15.0 µm, as determined by sedimentation using the instrument Sedigraph™ III Plus of Micromeritics Instrument Corporation, a degree of whiteness R457, measured in accordance with the ISO 2469 Standard, of at least 85% and a Yellowness Index according to DIN 6167 of at least 1.5. Alternatively, the obtained precipitated calcium carbonate has a specific BET surface area within the range of 3.0 m$^2$/g to 35.0 m$^2$/g, the particles have a weight median particle size $d_{50}$ value of less than 10.0 µm, as determined by sedimentation using the instrument Sedigraph™ III Plus of Micromeritics Instrument Corporation, a degree of whiteness R457, measured in accordance with the ISO 2469 Standard, of at least 90% and a Yellowness Index according to DIN 6167 of at least 2.0. Alternatively, the obtained precipitated calcium carbonate has a specific BET surface area within the range of 4.0 m$^2$/g to 20.0 m$^2$/g, the particles have a weight median particle size $d_{50}$ value of less than 5.0 µm, as determined by sedimentation using the instrument Sedigraph™ III Plus of Micromeritics Instrument Corporation, a degree of whiteness R457, measured in accordance with the ISO 2469 Standard, of between 85 and 95% and a Yellowness Index according to DIN 6167 of between 2.0 and 4.5. Alternatively, the obtained precipitated calcium carbonate has a specific BET surface area within the range of 4.0 m$^2$/g to 20.0 m$^2$/g, the particles have a weight median particle size $d_{50}$ value of less than 3.0 µm, as determined by sedimentation using the instrument Sedigraph™ III Plus of Micromeritics Instrument Corporation, a degree of whiteness R457, measured in accordance with the ISO 2469 Standard, of between 90 and 95% and a Yellowness Index according to DIN 6167 of between 2.5 and 4.0.

If the precipitated calcium carbonate is provided in the form of a suspension, said precipitated calcium carbonate is optionally dispersed. Conventional dispersants known to the skilled person can be used. The dispersant can be anionic or cationic. A preferred dispersant is one based on polyacrylic acid. Such dispersants are preferably dosed so as to account for about 0.1 wt.-% to about 3.0 wt.-%, based on the total weight of said precipitated calcium carbonate. The active content in the polyacrylic acid based dispersant is preferably between 30.0 and 45.0 wt.-%, based on the total weigh of the dispersant.

In view of the good results obtained, a further aspect of the present invention is directed to an aqueous suspension comprising the precipitated calcium carbonate, which is obtainable by the instant process. Another aspect of the present invention is directed to a partially dewatered or essentially completely dried precipitated calcium carbonate, which is obtainable by the instant process. In particular, the partially dewatered or essentially completely dried precipitated calcium carbonate is obtained by drying or dewatering the aqueous suspension comprising the precipitated calcium carbonate obtained in step d) of the process of the present invention.

The precipitated calcium carbonate thus obtained, either in form of an aqueous suspension comprising the precipitated calcium carbonate and/or in form of a partially dewatered or essentially completely dried precipitated calcium carbonate, can be used in paper making, paper coating, plastic, agricultural, adhesives, sealants and/or paint applications. In particular, the precipitated calcium carbonate thus obtained, either in form of an aqueous suspension comprising the precipitated calcium carbonate and/or in form of a partially dewatered or essentially completely dried precipitated calcium carbonate, can be used in lightweight papers such as cigarette papers, thin print papers, SC magazine papers and the like, and in printing or writing papers such as copy papers, uncoated- and coated offset papers and the like.

In particular, aqueous suspensions comprising the precipitated calcium carbonate and/or partially dewatered or essentially completely dried precipitated calcium carbonates according to the invention are characterized in that they contain precipitated calcium carbonate obtained by the process of the present invention. The particles of the precipitated calcium carbonate according to the present invention are especially characterized in that they provide improved optical properties such as increased or optimized opacity, expressed by an optimized balance of whiteness R457, yellowness index and brightness, in comparison to precipitated calcium carbonates prepared by processes of the prior art. In contrast to prior art processes, the foregoing is not achieved by a shading strategy such as by the addition of synthetic colorants but rather through the incorporating of manganese ions as foreign ions in the calcite crystal lattice of the precipitated calcium carbonate. It is believed that such manganese ion incorporation in the crystal lattice of the precipitated calcium carbonate results in particles featuring a higher absorption of UV- and visible light compared to the precipitated calcium carbonates prepared by processes of the prior art and thus showing increased or optimized opacity. As another advantage, the precipitated calcium carbonate obtained by the process of the present invention can be prepared in a simple way and in high yield without using synthetic colorants.

The following examples may additionally illustrate the invention, but are not meant to restrict the invention to the exemplified embodiments. The examples below show the good optical properties such as opacity of the precipitated calcium carbonate suspensions according to the present invention.

EXAMPLES

Measurement Methods

The following measurement methods are used to evaluate the parameters given in the examples and claims.

Brookfield Viscosity

The Brookfield-viscosity of a slurry was determined with a Brookfield Viscometer type RVT equipped with a LV-3 spindle at a speed of 100 rpm and room temperature (20±3° C.).

BET Specific Surface Area of a Material

Throughout the present document, the specific surface area (in m$^2$/g) of a particulate material was determined using the BET method (using nitrogen as adsorbing gas), which is well known to the skilled man (ISO 9277:1995). The total surface area (in m$^2$) of the particulate material is then obtained by multiplication of the specific surface area and the mass (in g) of the particulate material. The method and the instrument are known to the skilled person and are commonly used to determine the specific surface of particulate materials.

Particle Size Distribution (Mass % Particles with a Size <X) and Weight Median Particle Size ($d_{50}$) of a Particulate Material Throughout the present invention, $d_{50}$ is the weight median particle diameter, i.e. representing the particle size at which 50.0 wt.-% of the particles are coarser or finer.

The weight median particle diameter was measured using the sedimentation method. Particle mass was measured directly via X-ray absorption. The sedimentation method measures the gravity-induced settling rates of different size particles in a liquid with known properties. The measurement is made with a Sedigraph™ III Plus of Micromeritics Instrument Corporation. The method and the instrument are known to the skilled person and are commonly used to determine grain size of fillers and pigments. The measurement was carried out in an aqueous solution of 0.1 wt.-% of a cationic dispersant (Polystabil CGU supplied by Stockhausen GmbH, Germany). The samples were dispersed using a high speed stirrer and supersonic.

Alternatively, the weight median particle size and the average particle size mass distribution of a particulate material was determined via laser diffraction, i.e. the light from a laser passes through a suspension and the particle size distribution is calculated from the resulting diffraction pattern. The measurement was made with a HELOS Particle size analyzer and the Software WINDOX of Sympatec GmbH. The method is well known to the skilled person and is commonly used to determine the particle size distribution of particulate materials. The measurement was carried out with a homogenous aqueous slurry having a solids content of about 20.0 wt.-%, based on the total weight of the aqueous slurry. The samples were shaken well until the aqueous slurry is homogenously mixed, i.e. until no sediments were left in the slurry before measuring. As reference material SiC-F1200' of Sympatec GmbH was used, which was prepared as a homogeneous aqueous slurry having a solids content of 20.0 wt.-%, based on the total weight of the aqueous slurry. The samples were homogeneously mixed by using an ultrasonic bath.

Pigment Brightness and Paper Opacity

Pigment brightness and paper opacity were measured using an ELREPHO 3000 from the company Datacolor according to ISO 2469:1994 (DIN 53145-2:2000 and DIN 53146:2000).

Whiteness R457 and Yellowness Index Measurement

Whiteness and yellowness index were determined according to norm TAPPI T452/ISO 247. Glossiness was determined according to DIN 54 502/TAPPI 75.

PH of an Aqueous Suspension

The pH of the aqueous suspension is measured using a standard pH-meter at approximately 22° C.

Solids Content of an Aqueous Suspension

The suspension solids content (also known as "dry weight") is determined using a Moisture Analyser HR73 commercialized by Mettler-Toledo with the following settings: temperature of 120° C., automatic switch off 3, standard drying, 5-20 g of suspension.

d/d

The term "d/d" refers to the dry amount based on the dry amount of the solid material.

Filler Content (Ash Content)

The filler content in the samples such as handsheets and cigarette papers was determined by burning a defined amount of the sample in a muffle furnace heated to 570° C. After the burning was completed, the residue was transferred in a desiccator and allowed to cool down. When room temperature was reached, the weight of the residue was measured and the mass was related to the initially measured weight of the sample.

Handsheet Study

For the handsheet study, *eucalyptus* kraft pulp (obtained from SAPPI Schweiz AG, Biberist Switzerland) refined to 30° SR was used. An aqueous suspension was prepared by diluting 60 g (dry) pulp and an amount of the corresponding precipitated calcium carbonate required to achieve the desired filler content to a total volume of 10 L. The obtained suspension was stirred for at least 12 min. Subsequently, 450 ml of the obtained suspension were mixed with 0.06 wt.-% (based on dry weight) of polyacrylamide (Polymin 1530, commercially available from BASF, Ludwigshafen, Germany) as retention aid. Then, handsheets of the 80 g/m² were formed using a Rapid-Kothen hand sheet former. On each sheet a cover sheet was placed. The sheets were then dried using the Rapid-Kothen drier by applying vacuum such that a constant pressure over the whole sheet is obtained and a temperature of 105° C. for 6 min.

The filler content of handsheets was determined after constant weight was reached upon rapid incineration of a quarter handsheet sample at 570° C. in a muffle furnace. After burning was completed, the residue was transferred in a desiccator and allowed to cool down. When room temperature was reached, the weight of the residue was measured and the mass was correlated with the initial weight of the quarter hand sheet. To determine the grammage, handsheets were kept at 23° C. and 50% relative humidity for 24 hours.

VIS/UV Spectroscopy

The VIS spectroscopy results were obtained by using a Perkin Elmer Lambda 2 UV/VIS spectrometer and usage of Integrating Sphere as accessory for reflective-measurement. That is to say, the UV rays are directly reflected on the filler particle surface, the light is then entering the integrating sphere (I-sphere), where it multiply reflected and ultimately ends up in the detector. The samples were measured by using a sample holder under usage of 8° angle against aluminum as zero line. Furthermore, it is to be noted that the measurement is only started after a stable measurement signal is reached (up to the third decimal place). The scanning rate was 15 nm/min. The samples in form of 40 mm pellets were immediately measured after pressing at 10 t (by using a press of PerkinElmer Inc., Germany) and 40 t (by using a pelletizing press of HERZOG Maschinenfabrik GmbH & Co. KG, Germany).

Example 1—Comparative Example

The following comparative example illustrates the preparation of precipitated calcium carbonate by a process of the prior art. Said process is carried out by slaking calcium oxide and contacting the obtained hydrated calcium oxide with gaseous $CO_2$ to convert the hydrated calcium oxide into precipitated calcium carbonate.

200 kg of PCC grade high-purity quicklime CaO (Kalkwerk LEUBE, Golling/Austria) was added to 1 700 liters of 40° C. tap water in a stirred slaking reactor. Before slaking, 0.66 kg of a 30 wt.-% aqueous solution of sodium citrate-was added to the slaking water. The quicklime was slaked for 30 min under continuous stirring and the resulting slurry of hydrated calcium oxide ("milk of lime") was adjusted to 13.5 wt.-% solids content, based on the total weight of the slurry, via dilution with water having a temperature of 60° C. The resulting slurry was then screened on a 200 µm screen to remove grit.

The subsequent carbonation was conducted in a 2 000 liters baffled cylindrical stainless steel reactor equipped with a gassing agitator, a stainless steel carbonation tube to direct a carbon dioxide/air gas stream to the impeller and probes for monitoring the pH and conductivity of the suspension. 1 800 liters of the 13.5 wt.-%, based on the total weight of the slurry, aqueous suspension of hydrated calcium oxide obtained in the slaking step as described above were added to the reactor and adjusted to a temperature of 50° C. Prior to carbonation, 1.7 kg of sucrose was added to the milk of lime and the reaction mixture was homogenized for 5 min via agitation.

A gas mixture containing 20% by volume of $CO_2$ and 80% by volume of air was then bubbled upwards through the slurry at a volumetric flow of 200 $Nm^3$/h under vigorous agitation. During the carbonation, the temperature of the reaction mixture was not controlled and allowed to rise due to the heat generated in the exothermic precipitation reaction. The carbonation was continued until the electrical conductivity suddenly dropped and passed through a minimum indicating that the carbonation was substantially complete. The introduction of the $CO_2$-containing gas was continued for another 10 min before the introduction of gas was stopped. Carbonation time, calculated from start of gas introduction to time of conductivity minimum, was 103 min. The slurry was then screened on a 45 µm screen and the screened product was recovered as an aqueous slurry of $CaCO_3$.

Characteristics and physical properties are given in column A of table 1.

Example 2—Inventive Example

The following illustrative example of the invention involves the preparation of precipitated calcium carbonate by carbonating hydrated calcium oxide with gaseous $CO_2$ to convert the hydrated calcium oxide into precipitated calcium carbonate, wherein the carbonation is carried out in the presence of a water-soluble manganese(II) source.

Example 2 was carried out in a similar manner as Example 1, with the exception that a parent solution of manganese(II) sulfate monohydrate was added to the diluted slurry of hydrated calcium oxide having solids content of 13.5 wt.-%, based on the total weight of the slurry, in an amount of 300 ppm (d/d), based on the total dry weight of the hydrated calcium oxide, after slaking but before the carbonating was started.

The parent solution of manganese(II) sulfate monohydrate having a concentration of manganese(II) sulfate monohydrate of about 30%, based on the total weight of the parent solution, was prepared by dissolving 300 g of manganese(II) sulfate monohydrate per liter water. The product was recovered as an aqueous suspension.

Characteristics and physical properties are given in column B of table 1.

Example 3—Inventive Example

Example 3 was carried out in a similar manner as Example 2, with the exception that the parent solution of manganese(II) sulfate monohydrate was added to the hydrated calcium oxide suspension in an amount of 500 ppm (d/d), based on the total dry weight of the hydrated calcium oxide.

The product was recovered as an aqueous suspension. Characteristics and physical properties are given in column C of table 1.

TABLE 1

| | | column | | |
|---|---|---|---|---|
| | | A | B | C |
| | | example | | |
| | | 1 (reference) | 2 | 3 |
| specific surface area BET | $m^2$/g | 10.8 | 11.1 | 11.2 |
| PSD weight median particle size $d_{50}$ | | | | |
| HELOS Particle size analyzer | µm | 2.91 | 2.96 | 2.91 |
| Sedigraph III Plus | µm | 1.68 | 1.61 | 1.59 |
| Brightness (DIN 53145) | | | | |
| L* | | 99.08 | 98.49 | 98.23 |
| a* | | −0.02 | 0.18 | 0.25 |
| b* | | 0.86 | 1.32 | 1.52 |
| R457 (ISO 2469) | % | 96.50 | 94.36 | 93.42 |
| Yellowness index (DIN 6167) | % | 1.57 | 2.59 | 3.01 |
| Solids content Slurry | % | 16.4 | 16.4 | 16.4 |
| Viscosity Slurry (Brookfield 100 rpm) | mPas | 26 | 25 | 27 |
| pH Slurry | | 7.6 | 7.8 | 7.7 |

As can be gathered from the data shown in table 1, the inventive method especially leads to precipitated calcium carbonate having a reduced brightness and whiteness R457 and an increased yellowness index and thus results in a precipitated calcium carbonate with increased or optimized opacity.

Furthermore, UV- and visible light absorption determined by spectroscopy analysis is significantly higher for Example 3, which has been prepared by adding 500 ppm (Example 3) of manganese(II) sulfate monohydrate to the hydrated calcium oxide suspension, compared to the reference sample (Example 1) prepared in the absence of a water-soluble manganese source. In general, it can be gathered that the intensity of the spectral signal has in the middle of the VIS spectrum its lowest magnitude and rises stronger in the range of lower VIS spectrum (in direction of UV range) than at the beginning of the IR-range (800 nm). In the whole VIS spectrum, Example 3 (500 ppm of manganese(II) sulfate monohydrate) has the highest absorption, except in the range from 400 to 450 nm, where the reference sample (Example 1) has the highest absorption.

The VIS/UV spectroscopy results are shown in FIG. 1.

Example 4—Paper Study

Handsheet studies were done simulating copy paper comprising a precipitated calcium carbonate prepared in accordance with the inventive process and a calcium carbonate prepared in accordance with the prior art, respectively. In particular, the precipitated calcium carbonate prepared in accordance with the inventive process was prepared as described above for Example 2, i.e. a parent solution of manganese(II) sulfate monohydrate was added to a diluted slurry of hydrated calcium oxide having solids content of 13.5 wt.-%, based on the total weight of the slurry, in an amount of 300 ppm (d/d) after slaking but before the carbonating was started. Each paper had a weight of 80 g/m². The CaCO₃ content of the prepared papers was between 10 and 25 wt.-%, based on the total weight of the paper.

Characteristics and physical properties of the precipitated calcium carbonate prepared in accordance with the inventive process and the calcium carbonate prepared in accordance with the prior art are given in table 2.

TABLE 2

|  |  | example | |
|---|---|---|---|
|  |  | 1 (prior art) | 2 (inventive) |
| specific surface area BET | m²/g | 10.3 | 10.6 |
| PSD weight median particle size d₅₀ |  |  |  |
| HELOS Particle size analyzer | μm | 2.41 | 2.17 |
| Sedigraph III Plus | μm | 1.39 | 1.37 |
| R457 (ISO 2469) | % | 97.1 | 94.6 |
| Yellowness index (DIN 6167) | % | 1.4 | 2.4 |
| Solids content slurry | % | 34.9 | 36.9 |
| Viscosity Slurry (Brookfield 100 rpm) | mPas | 295 | 496 |
| pH slurry |  | 8.3 | 8.3 |

Characteristics such as the filler content, opacity as well as whiteness R457 of the obtained papers comprising the precipitated calcium carbonate prepared in accordance with the inventive process and the calcium carbonate prepared in accordance with the prior art are given in table 3.

TABLE 3

| Paper comprising | filler content [wt.-%] | Opacity [%] | Whiteness R457 [%] |
|---|---|---|---|
| Prior art PCC | 11.86 | 92.85 | 88.71 |
|  | 16.24 | 93.48 | 89.21 |
|  | 20.57 | 93.88 | 90.15 |
| Inventive PCC | 10.89 | 92.63 | 88.25 |
|  | 15.42 | 93.69 | 89.08 |
|  | 19.58 | 94.06 | 89.71 |

Figure 2:
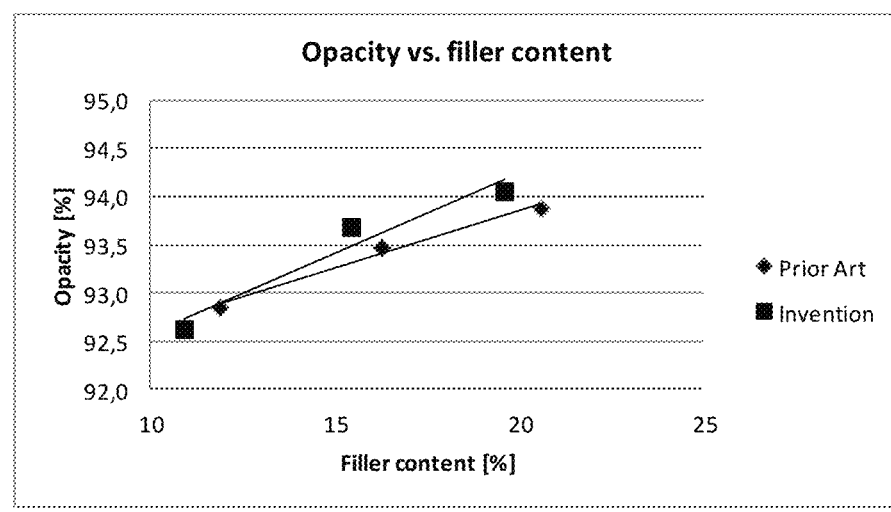
FIG. 2 is a graph of opacity versus filler content and illustrates the effect of manganese (II) sulfate monohydrate addition on a handsheet study as discussed in Example 4.

As can be also gathered from the data shown in FIG. 2, the inventive method especially leads to precipitated calcium carbonate achieving an increased or optimized opacity when implemented as filler material in paper compared to a prior art calcium carbonate.

Example 5—Cigarette Paper Study

This example discloses the preparation of cigarette paper on an industrial cigarette paper machine. The design and setting of such a machine is well known to the skilled person.

For comparison reasons, cigarette paper comprising a precipitated calcium carbonate prepared in accordance with the inventive process and cigarette paper comprising a calcium carbonate prepared in accordance with the prior art were produced. Each paper had a weight of 25 g/m², and the CaCO₃ content of the prepared cigarette papers was about 30 wt.-%, based on the total weight of the cigarette paper.

In particular, the precipitated calcium carbonate prepared in accordance with the inventive process was prepared as described above for Example 2, i.e. a parent solution of manganese(II) sulfate monohydrate was added to a diluted slurry of hydrated calcium oxide having solids content of 13.5 wt.-%, based on the total weight of the slurry, in an amount of 300 ppm (d/d), based on the total dry weight of the hydrated calcium oxide, after slaking but before the carbonating was started.

Characteristics and physical properties of the precipitated calcium carbonate prepared in accordance with the inventive process and the calcium carbonate prepared in accordance with the prior art are given in table 4.

TABLE 4

|  |  | Example | |
|---|---|---|---|
|  |  | 1 (prior art) | 2 (inventive) |
| specific surface area BET | m²/g | 10.6 | 10.6 |
| PSD weight median particle size d₅₀ |  |  |  |
| HELOS Particle size analyzer | μm | 2.25 | 2.17 |
| Sedigraph III Plus | μm | 1.39 | 1.37 |
| R457 (ISO 2469) | % | 97.1 | 94.6 |
| Yellowness index (DIN 6167) | % | 1.3 | 2.4 |
| Solids content slurry | % | 35.3 | 36.9 |
| Viscosity Slurry (Brookfield 100 rpm) | mPas | 380 | 496 |
| pH slurry |  | 9.1 | 8.3 |

The pulp used for the preparation of the cigarette paper in both cases consisted of 50 wt.-% virgin fibers and 50 wt.-% broke. The virgin fibers consisted of 30% long fibers and 70% short fibers.

The following machine parameters were used:

| Speed wire: | 206 m/min |
|---|---|
| Speed pope: | 220 m/min |
| Production: | 465 kg/h |

The pulp was combined with water and the following additives:

Cationic starch (2%) at a rate of 250 l/h, and
Precipitated calcium carbonate at a rate of 189 kg/h.

After the combination, the resulting material was refined in a refiner so that the long fibers showed a ° SR of 70.

After the wet-end, the wet-press and the dryer section the obtained papers showed the properties as described in Table 5:

TABLE 5

|  | Cigarette paper with pigment 1 (prior art) | Cigarette paper with pigment 2 (inventive) |
|---|---|---|
| Opacity [%] | 69.61 | 70.64 |
| Brightness [%] | 92.37 | 92.43 |
| Yellowness index | 3.88 | 3.80 |

It has to be noted that the above values for opacity, brightness and yellowness represent average values that were taken from several trials.

As can be derived from table 5, the average opacity obtained with the inventive precipitated calcium carbonate was about 71% (70.64%) and 70% (69.61%) of the precipitated calcium carbonate prepared according to the prior art. This means that the use of the inventive precipitated calcium carbonate provides an increase in opacity of about 1.5%.

Figure 3:
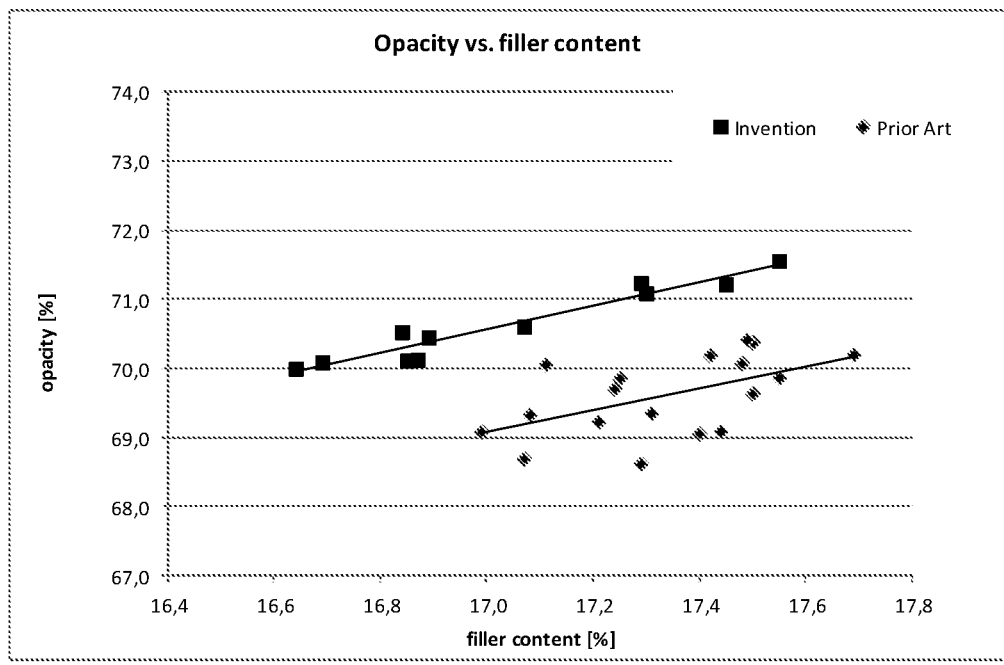
FIG. 3 is a graph of opacity versus filler content and illustrates the effect of manganese (II) sulfate monohydrate addition on a cigarette paper study as discussed in Example 5.

The opacity of the obtained cigarette papers comprising the precipitated calcium carbonate prepared in accordance with the inventive process and the calcium carbonate prepared in accordance with the prior art are also shown in FIG. 3.

As can be gathered from the data shown in FIG. 3, the inventive method especially leads to precipitated calcium carbonate achieving an increased or optimized opacity when implemented as filler material in cigarette paper compared to a prior art calcium carbonate.

Example 6—Paper Study

Handsheet studies were done simulating copy paper comprising a precipitated calcium carbonate prepared in accordance with the inventive process and a calcium carbonate prepared in accordance with the prior art, respectively. In particular, the precipitated calcium carbonate prepared in accordance with the inventive process was prepared as described above for Example 2, i.e. a parent solution of manganese(II) sulfate monohydrate was added to a diluted slurry of hydrated calcium oxide having solids content of 13.5 wt.-%, based on the total weight of the slurry, in an amount of 500 ppm (d/d), based on the total dry weight of the hydrated calcium oxide, after slaking but before the carbonating was started. Each paper had a weight of 80 g/m². The $CaCO_3$ content of the prepared papers was between 10 and 25 wt.-%, based on the total weight of the paper.

Characteristics and physical properties of the precipitated calcium carbonate prepared in accordance with the inventive process and the calcium carbonate prepared in accordance with the prior art are given in table 6.

TABLE 6

| | | Example | |
|---|---|---|---|
| | | 1 (prior art) | 2 (inventive) |
| specific surface area BET | m²/g | 6.1 | 6.3 |
| PSD weight median particle size d$_{50}$ | | | |
| HELOS Particle size analyzer | µm | 3.60 | 3.55 |
| Sedigraph III Plus | µm | 2.28 | 2.29 |
| R457 (ISO 2469) | % | 96.9 | 90.3 |
| Yellowness index (DIN 6167) | % | 1.3 | 4.8 |
| Solids content slurry | % | 35.2 | 38.9 |
| Viscosity Slurry (Brookfield 100 rpm) | mPas | 110 | 330 |
| pH slurry | | 8.9 | 8.6 |

Characteristics such as the filler content, opacity as well as whiteness R457 of the obtained papers comprising the precipitated calcium carbonate prepared in accordance with the inventive process and the calcium carbonate prepared in accordance with the prior art are given in table 7.

TABLE 7

| Paper comprising | filler content [wt.-%] | Opacity [%] | Whiteness R457 [%] |
|---|---|---|---|
| Prior art PCC | 12.42 | 86.255 | 86.91 |
| | 15.93 | 88.62 | 87.30 |
| | 19.89 | 89.51 | 87.48 |
| Inventive PCC | 9.46 | 87.74 | 84.54 |
| | 14.72 | 89.25 | 85.29 |
| | 19.86 | 90.89 | 85.22 |

Figure 4:
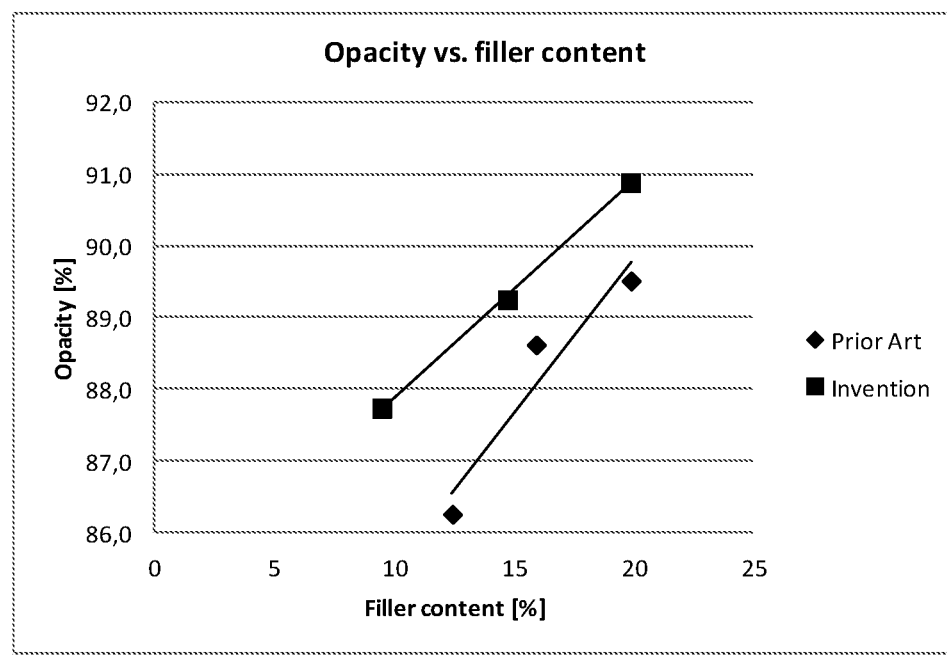
FIG. 4 is a graph of opacity versus filler content and illustrates the effect of manganese (II) sulfate monohydrate addition on a paper study as discussed in Example 6.

As can be also gathered from the data shown in FIG. 4, the inventive method especially leads to precipitated calcium carbonate achieving an increased or optimized opacity when implemented as filler material in paper compared to a prior art calcium carbonate.

The invention claimed is:

1. A process for preparing an aqueous suspension comprising precipitated calcium carbonate, the process comprising the steps of:
    a) providing at least one calcium source being essentially insoluble in water;
    b) providing at least one water-soluble manganese source;
    c) providing at least one carbonate source;
    d) carbonating the at least one calcium source of step a) with the at least one carbonate source of step c) in the presence of the at least one water-soluble manganese source of step b) in an aqueous medium to convert the calcium source at least partially into precipitated calcium carbonate and obtain an aqueous suspension comprising precipitated calcium carbonate, wherein the at least one water-soluble manganese source of step b) is present in carbonating step d) in an amount from 10 ppm to 1000 ppm (d/d), based on the total dry weight of the at least one calcium source of step a); and
    e) dewatering the obtained aqueous suspension comprising precipitated calcium carbonate to remove a portion of water to obtain a partially dewatered precipitated calcium carbonate in form of an aqueous suspension having a solids content from 20.0 to 70.0 wt.-%, based on the total weight of the aqueous suspension.

2. The process according to claim 1, wherein the at least one calcium source of step a) is selected from the group consisting of calcium oxide, calcined dolomite, dolomite, limestone, calcium carbonate, hydrated calcium oxide, calcium arsenate, calcium arsenite, calcium benzoate, calcium chromate, calcium citrate, calcium fluoride, calcium phosphate, calcium silicate, calcium sulfate, calcium sulphide, calcium tartrate, and any mixture thereof.

3. The process according to claim 1, wherein the at least one calcium source of step a) is hydrated calcium oxide.

4. The process according to claim 1, wherein the at least one calcium source of step a) is provided in an aqueous environment.

5. The process according to claim 1, wherein the at least one calcium source of step a) is provided in an aqueous environment comprising the at least one calcium source of step a) in an amount of from 1.0 to 60.0 wt.-%, based on the total weight of the aqueous environment and the at least one calcium source of step a).

6. The process according to claim 1, wherein the at least one calcium source of step a) is provided in an aqueous environment comprising the at least one calcium source of step a) in an amount of from 5.0 to 20.0 wt.-%, based on the total weight of the aqueous environment and the at least one calcium source of step a).

7. The process according to claim 1, wherein the at least one water-soluble manganese source of step b) is selected from the group consisting of a manganese(II) source, a manganese(III) source, and a mixture thereof.

8. The process according to claim 1, wherein the at least one water-soluble manganese source of step b) is from a manganese(II) source.

9. The process according to claim 1, wherein the at least one water-soluble manganese source of step b) is at least one manganese(II) source selected from the group consisting of manganese(II) sulfate, manganese(II) hydroxide, manganese(II) chloride, manganese(II) acetate, manganese(II) arsenite, manganese(II) benzoate, manganese(II) bromide, manganese(II) carbonate, manganese(II) chlorate, manganese(II) citrate, manganese(II) formate, manganese(II) iodide, manganese(II) nitrate, manganese(II) oxalate, manganese(II) phosphate, manganese(II) tartrate, manganese(II) thiocyanate, and any mixture thereof.

10. The process according to claim 1, wherein the at least one water-soluble manganese source of step b) is manganese (II) sulfate monohydrate.

11. The process according to claim 1, wherein the at least one carbonate source of step c) is derived from a gaseous $CO_2$ source in the presence of water, and/or a carbonate-comprising anion.

12. The process according to claim 1, wherein the at least one carbonate source of step c) is derived from a $CO_2$ comprising gas in the presence of water, and/or a carbonate-comprising anion selected from the group consisting of sodium carbonate, potassium carbonate, sodium hydrogen carbonate, potassium hydrogen carbonate, and any mixture thereof.

13. The process according to claim 1, wherein the at least one calcium source of step a) is hydrated calcium oxide, the at least one water-soluble manganese source of step b) is manganese(II) sulfate monohydrate, and the least one carbonate source of step c) is derived from a $CO_2$ comprising gas in the presence of water.

14. The process according to claim 1, wherein the at least one water-soluble manganese source of step b) is present in carbonating step d) in an amount from 20 ppm to 800 ppm (d/d), based on the total dry weight of the at least one calcium source of step a).

15. The process according to claim 1, wherein the at least one water-soluble manganese source of step b) is present in carbonating step d) in an amount from 50 ppm to 600 ppm (d/d), based on the total dry weight of the at least one calcium source of step a).

16. The process according to claim 1, wherein the at least one calcium source of step a) is added to an aqueous environment to convert the calcium source at least partially into calcium cations before carbonating step d) is carried out.

17. The process according to claim 1, wherein the at least one water-soluble manganese source of step b) is added before and/or during and/or after adding the at least one calcium source of step a) to the aqueous medium.

18. The process according to claim 1, wherein the at least one water-soluble manganese source of step b) is added after adding the at least one calcium source of step a) to the aqueous medium.

19. The process according to claim 1, wherein step d) is performed at a starting temperature of between 5° C. and 80° C.

20. The process according to claim 1, wherein step d) is performed at a starting temperature of between 10° C. and 70° C.

21. The process according to claim 1, wherein the aqueous suspension comprising precipitated calcium carbonate obtained in step d) has a solids content from 5.0 to 40.0 wt.-%, based on the total weight of the aqueous suspension.

22. The process according to claim 1, wherein the aqueous suspension comprising precipitated calcium carbonate obtained in step d) has a solids content from 10.0 to 20.0 wt.-%, based on the total weight of the aqueous suspension.

23. The process according to claim 1, wherein the precipitated calcium carbonate obtained by the process:
a) comprises particles having a weight median particle size d50 value of less than 15.0 μm, and/or
b) has a specific BET surface area of 1.0 $m^2/g$ to 50.0 $m^2/g$, and/or
c) has a degree of whiteness R457 of at least 85%, and/or
d) has a yellowness index of at least 1.5.

24. The process according to claim 1, wherein the precipitated calcium carbonate obtained by the process:
a) comprises particles having a weight median particle size d50 value of less than 3.0 μm, and/or
b) has a specific BET surface area of 4.0 $m^2/g$ to 20.0 $m^2/g$, and/or
c) has a degree of whiteness R457 of between 90 and 95%, and/or
d) has a yellowness index of between 2.0 and 4.0.

25. The process according to claim 1, wherein the partially dewatered precipitated calcium carbonate is in form of an aqueous suspension having a solids content from 25.0 to 60.0 wt.-%, based on the total weight of the aqueous suspension.

26. An aqueous suspension comprising the precipitated calcium carbonate obtained by the process according to claim 1, wherein the aqueous suspension comprising precipitated calcium carbonate has a solids content from 5.0 to 40.0 wt.-%, based on the total weight of the aqueous suspension, wherein the precipitated calcium carbonate comprises the at least one water-soluble manganese source, and wherein the precipitated calcium carbonate:
a) comprises particles having a weight median particle size d50 value of less than 15.0 μm,
b) has a specific BET surface area of 1.0 $m^2/g$ to 50.0 $m^2/g$,
c) has a degree of whiteness R457 of at least 85%, and
d) has a yellowness index of at least 1.5.

27. A partially dewatered precipitated calcium carbonate obtained by the process according to claim 1, wherein the partially dewatered precipitated calcium carbonate is in a form of an aqueous suspension having a solids content from 20.0 to 70.0 wt.-%, based on the total weight of the aqueous suspension, wherein the precipitated calcium carbonate comprises the at least one water-soluble manganese source, and wherein the precipitated calcium carbonate:
a) comprises particles having a weight median particle size d50 value of less than 15.0 μm,
b) has a specific BET surface area of 1.0 $m^2/g$ to 50.0 $m^2/g$,
c) has a degree of whiteness R457 of at least 85%, and
d) has a yellowness index of at least 1.5.

28. A paper, paper coating, plastic, agricultural product, adhesive, sealant or paint comprising the precipitated calcium carbonate according to claim 26 and/or a partially dewatered or essentially completely dried precipitated calcium carbonate thereof.

29. A process for preparing an aqueous suspension comprising precipitated calcium carbonate, the process comprising the steps of:
a) providing at least one calcium source being essentially insoluble in water;
b) providing at least one water-soluble manganese source;
c) providing at least one carbonate source, wherein the at least one carbonate source comprises at least one of potassium carbonate and potassium hydrogen carbonate; and
d) carbonating the at least one calcium source of step a) with the at least one carbonate source of step c) in the presence of the at least one water-soluble manganese source of step b) in an aqueous medium to convert the calcium source at least partially into precipitated calcium carbonate and obtain an aqueous suspension comprising precipitated calcium carbonate, wherein the at least one water-soluble manganese source of step b) is present in carbonating step d) in an amount from 10 ppm to 1000 ppm (d/d), based on the total dry weight of the at least one calcium source of step a).

30. A process for preparing an aqueous suspension comprising precipitated calcium carbonate, the process comprising the steps of:
   a) providing at least one calcium source being essentially insoluble in water;
   b) providing at least one water-soluble manganese source;
   c) providing at least one carbonate source;
   d) carbonating the at least one calcium source of step a) with the at least one carbonate source of step c) in the presence of the at least one water-soluble manganese source of step b) in an aqueous medium to convert the calcium source at least partially into precipitated calcium carbonate and obtain an aqueous suspension comprising precipitated calcium carbonate, wherein the at least one water-soluble manganese source of step b) is present in carbonating step d) in an amount from 10 ppm to 1000 ppm (d/d), based on the total dry weight of the at least one calcium source of step a); d) dewatering the obtained aqueous suspension comprising precipitated calcium carbonate to remove a portion of water to obtain a partially dewatered precipitated calcium carbonate in form of an aqueous suspension having a solids content from 20.0 to 70.0 wt.-%, based on the total weight of the aqueous suspension; and
   providing an additive to the at least one calcium source prior to the carbonating d), wherein the additive is selected from the group consisting of sugars, sugar alcohols, citric acid, a sodium salt of citric acid, a potassium salt of citric acid, a magnesium salt of citric acid, and an at least partially neutralized polyacrylic acid.

31. The process of claim 30, wherein the additive is selected from the group consisting of sugars and sugar alcohols.

* * * * *